United States Patent
Lee et al.

(10) Patent No.: US 10,977,227 B2
(45) Date of Patent: Apr. 13, 2021

(54) DYNAMIC SNAPSHOT ISOLATION PROTOCOL SELECTION

(71) Applicant: SAP SE, Walldorf (DE)

(72) Inventors: Juchang Lee, Seoul (KR); Chang Gyoo Park, Seoul (KR)

(73) Assignee: SAP SE, Walldorf (DE)

( * ) Notice: Subject to any disclaimer, the term of this patent is extended or adjusted under 35 U.S.C. 154(b) by 973 days.

(21) Appl. No.: 15/615,196

(22) Filed: Jun. 6, 2017

(65) Prior Publication Data

US 2018/0349418 A1 Dec. 6, 2018

(51) Int. Cl.
| | | |
|---|---|---|
| G06F 16/00 | (2019.01) | |
| G06F 16/21 | (2019.01) | |
| G06F 11/14 | (2006.01) | |
| G06F 16/27 | (2019.01) | |
| G06F 11/20 | (2006.01) | |
| G06F 16/185 | (2019.01) | |

(52) U.S. Cl.
CPC ........ *G06F 16/219* (2019.01); *G06F 11/1446* (2013.01); *G06F 16/27* (2019.01); *G06F 11/2094* (2013.01); *G06F 16/185* (2019.01)

(58) Field of Classification Search
CPC ............. G06F 11/1446; G06F 11/2094; G06F 16/185; G06F 16/219; G06F 16/27
See application file for complete search history.

(56) References Cited

U.S. PATENT DOCUMENTS

| | | |
|---|---|---|
| 5,452,445 A | 9/1995 | Hallmark |
| 6,205,449 B1 | 3/2001 | Rastogi et al. |
| 6,662,196 B2 | 12/2003 | Holenstein et al. |
| 7,290,056 B1 | 10/2007 | McLaughlin, Jr. |
| 7,305,421 B2 | 12/2007 | Cha et al. |
| 7,693,885 B2 | 4/2010 | Okada et al. |
| 8,332,354 B1 | 12/2012 | Chatterjee et al. |
| 8,385,314 B1 | 2/2013 | Sigg et al. |
| 8,442,962 B2 | 5/2013 | Lee et al. |

(Continued)

FOREIGN PATENT DOCUMENTS

| | | |
|---|---|---|
| EP | 2653986 | 10/2013 |
| EP | 2685698 | 1/2014 |

(Continued)

OTHER PUBLICATIONS

Daudjee, K., et al. "Lazy Database Replication with Ordering Guarantees" Proceedings of the 20th International Conference on Data Engineering (2004), 12 pp.

(Continued)

*Primary Examiner* — Dinku W Gebresenbet
(74) *Attorney, Agent, or Firm* — Klarquist Sparkman, LLP

(57) ABSTRACT

Technologies are described for facilitating the processing of requests for database operations in a distributed database environment. Criteria are defined for processing a request for a database operation according to first or second snapshot isolation protocols. A request for a database operation is received and it is determined if the snapshot isolation protocol criteria are met. If the criteria are met, the request can be processed using a local snapshot identifier value of a worker node. If the criteria are not met, the local snapshot identifier value is synchronized with another node, and the request processed using the updated snapshot identifier value.

20 Claims, 18 Drawing Sheets

(56) References Cited

U.S. PATENT DOCUMENTS

| | | | |
|---|---|---|---|
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,903,779 B1 | 12/2014 | Holenstein et al. | |
| 8,918,436 B2 | 12/2014 | Yoon et al. | |
| 8,935,205 B2 | 1/2015 | Hildenbrand et al. | |
| 9,009,182 B2 | 4/2015 | Renkes et al. | |
| 9,037,677 B2 | 5/2015 | Lee et al. | |
| 9,063,969 B2 | 6/2015 | Lee et al. | |
| 9,098,522 B2 | 8/2015 | Lee et al. | |
| 9,519,555 B2 | 12/2016 | Calder et al. | |
| 9,569,473 B1 | 2/2017 | Holenstein et al. | |
| 9,779,220 B1 | 10/2017 | Kronrod et al. | |
| 9,830,223 B1 | 11/2017 | Holenstein et al. | |
| 10,498,625 B1* | 12/2019 | Mozealous | H04L 67/16 |
| 2002/0194206 A1 | 12/2002 | Ganesh et al. | |
| 2003/0061537 A1 | 3/2003 | Cha et al. | |
| 2004/0133591 A1 | 7/2004 | Holenstein et al. | |
| 2004/0255048 A1 | 12/2004 | Lev Ran et al. | |
| 2008/0065670 A1 | 5/2008 | Cha et al. | |
| 2008/0163062 A1 | 7/2008 | Lee et al. | |
| 2009/0024851 A1 | 1/2009 | Andrade | |
| 2009/0313311 A1 | 6/2009 | Hoffmann et al. | |
| 2009/0172201 A1 | 7/2009 | Carmel | |
| 2009/0292744 A1 | 11/2009 | Matsumura | |
| 2011/0225121 A1 | 9/2011 | Cooper | |
| 2012/0054533 A1 | 3/2012 | Shi et al. | |
| 2012/0084273 A1 | 4/2012 | Lee et al. | |
| 2012/0084274 A1 | 4/2012 | Renkes et al. | |
| 2012/0102006 A1 | 4/2012 | Larson et al. | |
| 2012/0105424 A1 | 5/2012 | Lee et al. | |
| 2012/0166407 A1 | 6/2012 | Lee et al. | |
| 2012/0167098 A1 | 6/2012 | Lee et al. | |
| 2012/0173589 A1 | 7/2012 | Kwon et al. | |
| 2012/0303576 A1 | 11/2012 | Calder et al. | |
| 2012/0323849 A1 | 12/2012 | Garin, Jr. et al. | |
| 2013/0117307 A1* | 5/2013 | Vishnoi | G06F 16/2343 707/770 |
| 2013/0124475 A1* | 5/2013 | Hildenbrand | G06F 16/2315 707/636 |
| 2013/0151494 A1 | 6/2013 | Dhamankar et al. | |
| 2013/0166534 A1 | 6/2013 | Yoon et al. | |
| 2013/0166553 A1 | 6/2013 | Yoon et al. | |
| 2013/0166554 A1 | 6/2013 | Yoon et al. | |
| 2013/0235000 A1 | 9/2013 | Lee et al. | |
| 2013/0275457 A1 | 10/2013 | Lee et al. | |
| 2013/0275467 A1 | 10/2013 | Lee et al. | |
| 2013/0275468 A1 | 10/2013 | Lee et al. | |
| 2013/0275550 A1 | 10/2013 | Lee et al. | |
| 2013/0290282 A1 | 10/2013 | Faerber et al. | |
| 2013/0304714 A1 | 11/2013 | Lee et al. | |
| 2014/0122439 A1 | 5/2014 | Faerber et al. | |
| 2014/0122452 A1 | 5/2014 | Faerber et al. | |
| 2014/0136473 A1 | 5/2014 | Faerber et al. | |
| 2014/0136788 A1 | 5/2014 | Faerber et al. | |
| 2014/0149353 A1 | 5/2014 | Lee et al. | |
| 2014/0149368 A1 | 5/2014 | Lee et al. | |
| 2014/0149527 A1 | 5/2014 | Lee et al. | |
| 2014/0156619 A1 | 6/2014 | Lee et al. | |
| 2014/0222418 A1 | 8/2014 | Richtarsky et al. | |
| 2014/0244628 A1 | 8/2014 | Yoon et al. | |
| 2014/0297686 A1 | 10/2014 | Lee et al. | |
| 2014/0304219 A1 | 10/2014 | Yoon et al. | |
| 2014/0334582 A1* | 11/2014 | Bock | H04J 3/0667 375/356 |
| 2014/0337393 A1 | 11/2014 | Burchall et al. | |
| 2014/0379658 A1* | 12/2014 | Cheriton | G06F 16/2322 707/639 |
| 2015/0074082 A1 | 5/2015 | Yoon et al. | |
| 2015/0149409 A1 | 5/2015 | Lee et al. | |
| 2015/0149413 A1 | 5/2015 | Lee et al. | |
| 2015/0149426 A1 | 5/2015 | Kim et al. | |
| 2015/0149704 A1 | 5/2015 | Lee et al. | |
| 2015/0149736 A1 | 5/2015 | Kwon et al. | |
| 2015/0178343 A1 | 6/2015 | Renkes et al. | |
| 2015/0242400 A1 | 8/2015 | Bensberg et al. | |
| 2015/0242451 A1 | 8/2015 | Bensberg et al. | |
| 2015/0254273 A1 | 9/2015 | Larson et al. | |
| 2015/0261805 A1 | 9/2015 | Lee et al. | |
| 2015/0278282 A1 | 10/2015 | Sardina et al. | |
| 2016/0262684 A1* | 9/2016 | Cacioppo | G16H 40/63 |
| 2016/0371356 A1 | 12/2016 | Lee et al. | |

FOREIGN PATENT DOCUMENTS

| | | |
|---|---|---|
| EP | 2738695 | 6/2014 |
| WO | WO 2016/045548 | 3/2016 |

OTHER PUBLICATIONS

Extended European Search Report, dated Mar. 16, 2018, EPC App. No. 16002568.0 (104 pages).

Aulbach et al., "Extensibility and Data Sharing in Evolving Multi-Tenant Databases," in 2011 IEEE 27th International Conference on Data Engineering. IEEE, pp. 99-110 (2011).

Bailis et al., "Hat, Not Cap: Towards Highly Available Transactions", in Proceedings of the 14th USENIX Conference on Hot Topics in Operating Systems, pp. 24, USENIX Association (2013).

Bailis et al., "Scalable Atomic Visibility with Ramp Transactions," in Proceedings of the 2014 ACM SIGMOD International Conference on Management of Data. ACM, pp. 27-38 (2014).

Barber et al., "In-Memory Blu Acceleration in IBM's db2 and dashdb: Optimized for Modern Workloads and Hardware Architectures," in Proceedings of the 2015 International Conference on Data Engineering (ICDE). IEEE (2015).

Berenson et al., "A Critique of Ansi SQL Isolation Levels," ACM SIGMOD Record, vol. 24, No. 2, pp. 1-10, (1995).

Bernstein et al., "Concurrency Control and Recovery in Database Systems," (1987).

Bernstein et al., "Optimizing Optimistic Concurrency Control for Tree-Structured, Log-Structured Databases," in Proceedings of the 2015 ACM SIGMOD International Conference on Management of Data. ACM, pp. 1295-1309 (2015).

Binnig et al., "Distributed Snapshot Isolation: Global Transactions Pay Globally, Local Transactions Pay Locally," The International Journal on Very Large Data Bases, vol. 23, No. 6, pp. 987-1011 (2014).

Cha et al., "An Extensible Architecture for Main-Memory Real-Time Storage Systems", RTCSA : 67-73 (1996).

Cha et al., "An Object-Oriented Model for FMS Control", J. Intelligent Manufacturing 7(5): 387-391 (1996).

Cha et al., "Cache-Conscious Concurrency Control of Main-Memory Indexes on Shared-Memory Multiprocessor Systems", VLDB: 181-190 (2001).

Cha et al., "Efficient Web-Based Access to Multiple Geographic Databases Through Automatically Generated Wrappers", WISE : 34-41 (2000).

Cha et al., "Interval Disaggregate: A New Operator for Business Planning", PVLDB 7(13): 1381-1392 (2014).

Cha et al., "Kaleidoscope: A Cooperative Menu-Guided Query Interface", SIGMOD Conference : 387 (1990).

Cha et al., "Kaleidoscope Data Model for An English-like Query Language", VLDB : 351-361 (1991).

Cha et al., "Meadow: A Middleware for Efficient Access to Multiple Geographic Databases Through OpenGIS Wrappers", Softw., Pract. Exper. 32(4): 377-402 (2002).

Cha et al., "Object-Oriented Design of Main-Memory DBMS for Real-Time Applications", RTCSA : 109-115 (1995).

Cha et al., "Paradigm Shift to New DBMS Architectures: Research Issues and Market Needs", ICDE: 1140 (2005).

Cha et al., "P*TIME: Highly Scalable OLTP DBMS for Managing Update-Intensive Stream Workload", VLDB: 1033-1044 (2004).

Cha et al., "Xmas: An Extensible Main-Memory Storage System", CIKM : 356-362 (1997).

Chang et al., "Bigtable: A Distributed Storage System for Structured Data," ACM Transactions on Computer Systems (TOCS), vol. 26, No. 2, p. 4, (2008).

(56) References Cited

OTHER PUBLICATIONS

Chaudhuri et al., "An Overview of Data Warehousing and OLAP Technology," ACM Sigmod Record, vol. 26, No. 1, pp. 65-74 (1997).
Cooper et al., "Pnuts: Yahoo!'s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Farber et al., SAP HANA Database: Data Management for Modern Business Applications. SIGMOD Record 40(4): 45-51 (2011).
Farber et al., "The SAP HANA Database—An Architecture Overview." IEEE Data Eng. Bull., vol. 35, No. 1, pp. 28-33 (2012).
Fekete et al., "Making Snapshot Isolation Serializable," ACM Transactions on Database Systems (TODS), vol. 30, No. 2, pp. 492-528 (2005).
Hwang et al., "Performance Evaluation of Main-Memory R-tree Variants", SSTD: 10-27 (2003).
Kallman et al., "Hstore: A High-Performance, Distributed Main Memory Transaction Processing System," Proceedings of the VLDB Endowment, vol. 1, No. 2, pp. 1496-1499 (2008).
Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kim et al., "Optimizing Multidimensional Index Trees for Main Memory Access", SIGMOD Conference: 139-150 (2001).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).
Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Lee et al., "A Performance Anomaly Detection and Analysis Framework for DBMS Development", IEEE Trans. Knowl. Data Eng. 24(8): 1345-1360 (2012).
Lee et al., "Differential Logging: A Commutative and Associative Logging Scheme for Highly Parallel Main Memory Databases", ICDE 173-182 (2001).
Lee et al., "High-Performance Transaction Processing in SAP HANA." IEEE Data Eng. Bull., vol. 36, No. 2, pp. 28-33 (2013).
Lee et al., "SAP HANA Distributed In-Memory Database System: Transaction, Session, and Metadata Management," in Data Engineering (ICDE), 2013 IEEE 29th International Conference on. IEEE, pp. 1165-1173 (2013).
Neumann et al., "Fast Serializable Multi-Version Concurrency Control for Main-Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Park et al., Xmas: An Extensible Main-Memory Storage System for High-Performance Applications. SIGMOD Conference : 578-580 (1998).

Plattner, H., "A Common Database Approach for OLTP and OLAP Using an In-Memory col. Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
Sikka et al. "Efficient Transaction Processing in SAP HANA Database: the End of a Column Store Myth", in Proceedings of the 2012 ACM SIGMOD International Conference on Management of Data, pp. 731-742. ACM (2012).
Tu et al., "Speedy Transactions in Multicore In-Memory Databases," in Proceedings of the Twenty-Fourth ACM Symposium on Operating Systems Principles. ACM, pp. 18-32 (2013).
Vogels, W., "Eventually Consistent," Communications of the ACM, vol. 52, No. 1, pp. 40-44 (2009).
Weikum et al., "Transactional Information Systems: Theory, Algorithms, and the Practice of Concurrency Control and Recovery," (2001).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Zamanian et al., "Locality-Aware Partitioning in Parallel Database Systems," in Proceedings of the 2015 ACM SIGMOD International Conference on Management of Data. ACM, pp. 17-30 (2015).
Extended European Search Report, dated Apr. 4, 2017, EPC Appl. No. 16002568.0, 17 pages.
Extended European Search Report, dated Apr. 5, 2017, EPC App. No. 16002546.6 (10 pages).
Kemme, et al., "Database Replication: A Tutorial," *Replication, Lncs*, 5959: 219-252, 2010.
Wiesmann, et al., "Understanding replication in databases and distributed systems," *Distributed Computing Systems*, pp. 464-474, 2000.
"SAP HANA SQL and System Views Reference," retrieved from https://help.sap.com/viewer/4fe29514fd584807ac9f2a04f6754767/2.0.00/en-US/4ba9edce1f2347a0b9fcda99879c17a1.html, on or before May 2017, 22 pages.
Lee, et al., "High-Performance Transaction Processing in SAP HANA," *IEEE Data Eng. Bull.*, 36(2): 28-33, 2013.
"Hint Details," retrieved from http://help-legacy.sap.com/saphelp_hanaplatform/helpdata/en/4b/a9edce1f2347a0b9fcda99879c17a1/content.htm, on or before May 2017, 11 pages.
Office Action received in European Patent Application No. 18175767.5, dated Sep. 6, 2019, 6 pages.
Binning et al., "Distributed snapshot isolation: global transactions pay globally, local transactions pay locally," Nov. 9, 2015, pp. 1-30.
"Research Gate—Distributed snapshot isoloation: global transactions pay locally, local transactions pay locally," retrieved from: https://www.researchgate.net/publication/271923603_Distrubuted_snapshot_isolation_global_globally_local transactions_pay_locally, Nov. 9, 2015, pp. 1-37.
Extended European Search Report, dated Mar. 9, 2017, EPC Appl. No. 16002574.8, 12 pages.
Extended European Search Report, dated Sep. 6, 2018, European Application No. 18175767.5, 11 pages.
Le, "Main Difference between 2PC and 3PC Protocols," https://www.linkedin.com/pulse/main-difference-between-2pc-3pc-protocols-thiensi-le, downloaded Oct. 8, 2018, 4 pages.
Non-Final Office Action mailed in U.S. Appl. No. 14/975,365, dated May 15, 2019 (23 pages).
Notice of Allowance mailed in U.S. Appl. No. 14/977,372, dated Sep. 6, 2019 (11 pages).
Final Office Action mailed in U.S. Appl. No. 14/975,365, dated Sep. 9, 2019 (22 pages).
Final Office Action issued in U.S. Appl. No. 14/975,365, dated Sep. 9, 2019, 22 pages.

(56) References Cited

OTHER PUBLICATIONS

Non-Final Office Action mailed in related U.S. Appl. No. 14/975,365, dated Feb. 21, 2020 (24 pages).
Examination Report received in European Patent Application No. 16002546.6, dated Nov. 29, 2018, 7 pages.

* cited by examiner

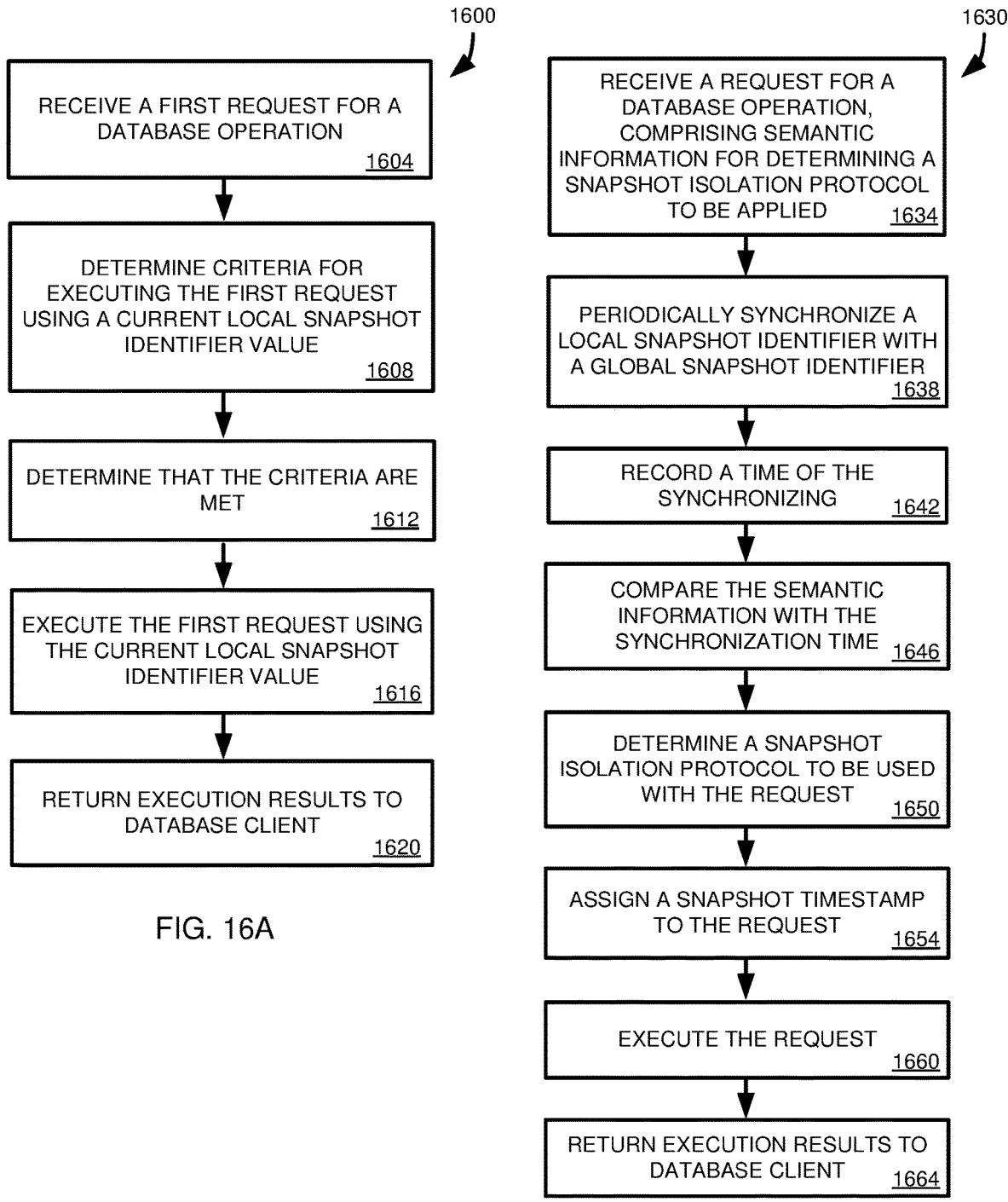

US 10,977,227 B2

DYNAMIC SNAPSHOT ISOLATION PROTOCOL SELECTION

FIELD

The present disclosure generally relates to processing database read or write operations in a distributed environment. Particular implementations relate to dynamic selection of a snapshot isolation policy to apply to a request for a database operation.

BACKGROUND

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host. However, distributed systems can present challenges in ensuring that database operations are carried out in a way that provides queries with accurate data, but without requiring so much coordination between hosts that the performance of the distributed system is significantly adversely affected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the execution of requests for database operations in a distributed database environment that includes a coordinator, or master, node, and one or more worker, or slave, nodes. In one aspect, a first worker node of the one or more worker nodes receives a first request for a database operation. The first worker node determines criteria for executing the first request using a current local snapshot identifier value. The first worker node determines that the criteria are met, or have been satisfied, and executes the first request using the current local snapshot identifier value.

In another aspect, a first worker node of the one or more worker nodes receives a request for a database operation. The request includes semantic information for determining a snapshot isolation protocol to be applied to the execution of the request. The first worker node periodically synchronizes a local snapshot identifier with a global snapshot identifier maintained by the coordinator node. The first worker node records a time associated with the synchronizing. The semantic information is compared with the synchronization time. A snapshot isolation policy to be used with the request is determined, such as based on the comparing. The first worker node assigns a snapshot timestamp to the request, executes the request, and returns execution results to a database client.

In a further aspect, a first worker node of the one or more worker nodes receives a first multi-node query language statement that includes a result lag value. A difference is determined between a current time and a time the first worker node synchronized a local snapshot identifier with a global snapshot identifier. It is determined that the difference is less than, or less than or equal to, the result lag value. The local snapshot identifier value is assigned to the first multi-node query language statement, which is then executed. Execution results are returned to a database client.

The various innovations can be used in combination or separately. As described herein, a variety of other features and advantages can be incorporated into the technologies as desired. The foregoing and other objects, features, and advantages of the invention will become more apparent from the following detailed description, which proceeds with reference to the accompanying figures.

BRIEF DESCRIPTION OF THE DRAWINGS

FIGS. 16A-16C are flowcharts of example methods summarizing actions occurring at a worker node of a distributed database system during various embodiments of disclosed innovations for selecting a snapshot isolation protocol to be applied to a database request by determining whether criteria for applying a snapshot isolation protocol have been met.

DETAILED DESCRIPTION

Example 1—Overview

Figure 1:
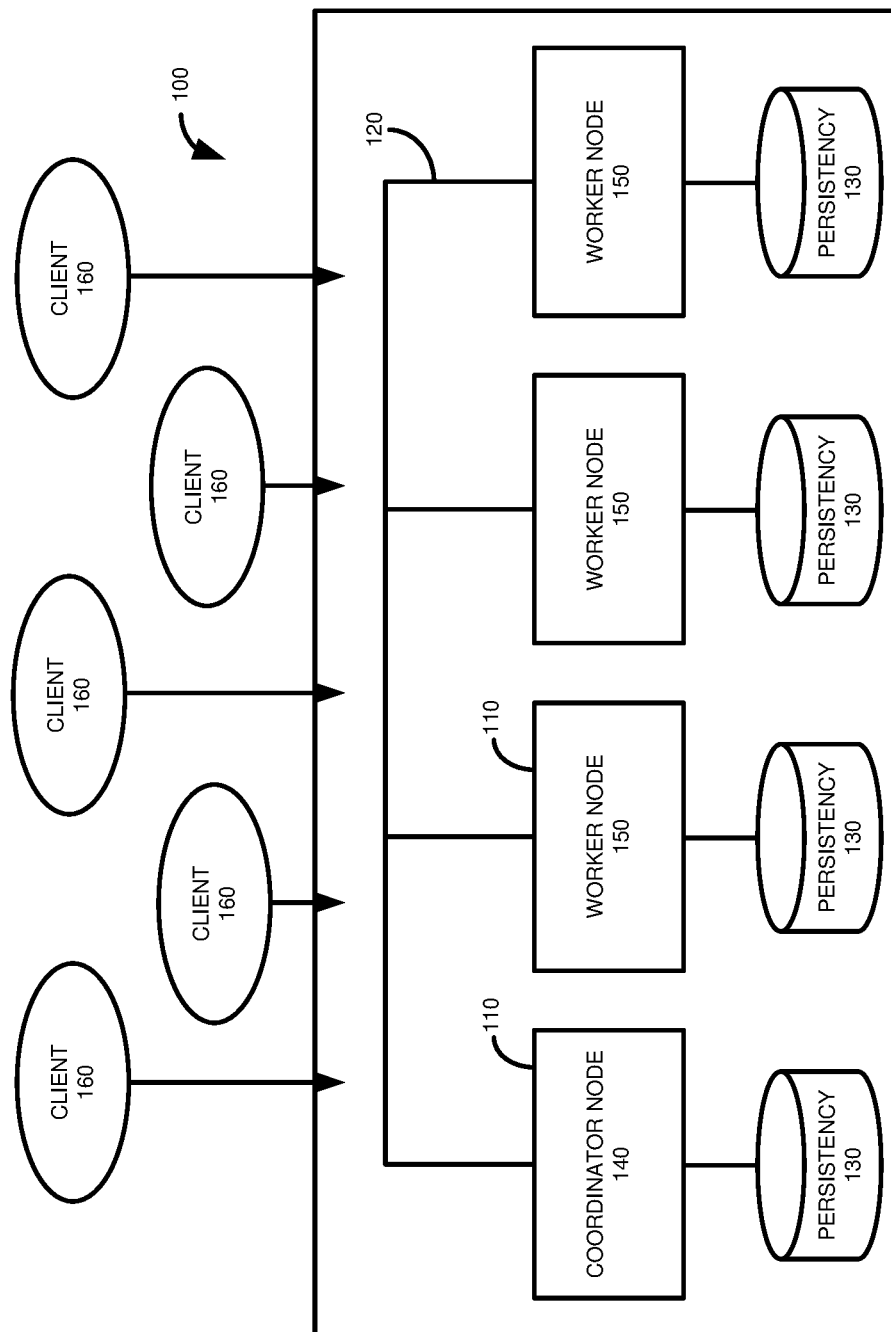
FIG. 1 is a diagram depicting a database environment having a coordinator node and a plurality of worker nodes in which at least certain disclosed innovations can be implemented.

Database systems are increasingly designed and optimized for memory-centric, massively-parallel data processing, not only in single database systems, but also in multi-host distributed database systems. Partitioning and distributing a database into multiple hosts is a desirable feature, especially for high-performance in-memory database systems, because it can leverage larger in-memory database spaces and a higher number of CPU cores beyond the limitations of a single physical machine (also referred to as a host, or node). For example, by partitioning and distributing large and fast growing fact tables over multiple hosts while replicating infrequently-updated dimension tables in a data warehouse system, or by partitioning a multi-tenant database into multiple hosts by tenants, it is typically possible to handle larger databases and higher workloads.

In at least certain embodiments of the present disclosure, a "snapshot" refers to view of the database system, or at least a portion thereof, as it existed at the time of the snapshot. For example, a query started under a particular snapshot would have available to it records as they existed at the time of the snapshot. The query would not see, for example, changes that were made to the records after the snapshot was acquired. In addition, in at least certain implementations, records are not removed if there is an open snapshot that will access them. If there is no open snapshot that can access a particular record version, the record version may be removed in a process sometimes referred to as garbage collection.

In a distributed database system, for at least certain types of requests for database operations, such as a query received by a worker node that accesses data at multiple database nodes, typical snapshot isolation policies provide that the worker node obtains an updated snapshot identifier value from the coordinator node before assigning a snapshot timestamp to the query and executing the query (or causing it to be executed). In this way, the query can access the most recent version of records available at the time the query stated. However, sending a request to the coordinator node, and receiving a response, can cause query execution to be delayed. In addition, if there are a sufficient number of such requests, the coordinator node can become overwhelmed with requests for the current snapshot timestamp identifier value.

A snapshot isolation protocol can provide that requests for database that accesses data at multiple database nodes be executed using a current value of a local snapshot identifier maintained by a worker node without requesting and receiving an updated global snapshot identifier value from a coordinator node. Such requests can be executed more quickly, because they do not require a communication with a coordinator node in order to obtain a snapshot timestamp value. However, a request executed using such a snapshot isolation policy, which can be referred to as a delayed snapshot isolation policy, potentially does not access the most current record versions of the database system. However, this lower-level of consistency may be unsuitable for certain database clients.

Particular embodiments of the present disclosure provide innovations for determining a snapshot isolation policy to apply to a request for a database operation. As described above, even if a database system can provide for the execution of requests for database operations using potentially weakened transactional consistency, it can be challenging to determine what requests for database operations can be executed under such snapshot isolation policies and which requests should be executed using a protocol that may have a higher level of transactional consistency.

In some cases, a request for a database operation can specify criteria useable to determine what snapshot isolation policy should be applied to a request. In other cases, the criteria can be specified elsewhere, such as in a policy for a particular database client, a particular database session, or a policy associated with one or more particular types of database operations (or types of database clients or sessions). In one aspect, criteria for determining a snapshot isolation policy to be applied to a request can include a hint or other semantic information (such as in a query language) in the request for a database operation (or associated with the database client, session, operation or client types, etc.). In a specific example, the semantic information can specify a threshold amount of acceptable delay or inconsistency, such as an amount of time between a current time and a time the worker node last synchronized its local snapshot identifier with a snapshot identifier maintained by the coordinator node. In some cases, the semantic information can be specifically included, and used, for snapshot isolation protocol selection. In other cases, the semantic information can be included for another purpose (such as determining whether cached results can be used), but additionally used (or instead used) for snapshot isolation protocol selection.

In some aspects, the worker node and the coordinator node can synchronize snapshot identifiers in a specific synchronization process. In further aspects, the worker node and the coordinator node can synchronize snapshot identifiers when the worker node executes a request for a database operation that is associated with a snapshot isolation policy where the worker node retrieves a current snapshot identifier value from the coordinator node before executing the request.

Thus, the present disclosure provides innovations for processing requests for database operations, where at least certain types of requests for database operations can be executed at a worker node without the worker node first communicating with a coordinator node for a current global snapshot identifier value. In addition to speeding request execution by avoiding inter-node communications, the disclosed innovations can reduce network resource use and processor and memory use associated with synchronizing a snapshot identifier value before executing a request. The present disclosure also provide mechanisms for requests (or database clients or administrators) to specify when a delayed snapshot isolation policy can be used, which can facilitate the use of such protocols and the advantages thereby provided.

Example 2—Distributed Database Environment

This Example 2 describes an example distributed database system that may be used with at least certain embodiments of the disclosed innovations, and characteristics and consistency properties of example workloads. This Example also describes a particular implementation of snapshot isolation.

FIG. 1 illustrates a database environment 100 having a plurality of database nodes 110 connected through a network 120. In a particular example, the network 120 is a high-speed/low-latency network. A host refers to a computing system having a processor and memory. A host may also be referred to as a node. Unless the context clearly indicates otherwise, a node can refer to the host in a single host system (such a single worker node), or one of a plurality of hosts in a system (such as one of a plurality of worker nodes).

As shown, each node 110 has its own persistency store 130. In some examples, one or more nodes 110 may have shared storage. In a particular example, such as for disaster recovery purposes, a remote instance of the system 100 can be configured to act as a hot standby cluster by continuously replaying logs shipped from the primary cluster 100.

The database nodes 110 are asymmetric, in some respects, since database node 140 has the role of a coordinator (or master) node and database nodes 150 function as worker (or slave) nodes. A coordinator node refers to a node (or host) that manages information regarding the coordinator node and one or more worker nodes. A worker node refers to a node that is installed on a different host than the coordinator node and has at least some of its activities or operations controlled or regulated by a coordinator node. In some examples described herein, a given node can act as a coordinator node at some times (e.g., for some transactions) but act as a worker node at other times (e.g., for other transactions).

In various aspects of the present disclosure, a coordinator node 140 may help manage snapshot isolation. For example, the coordinator node 140 may maintain one or more global transaction identifiers and send communications to, and receive communications from, one or more of the worker nodes 150 to determine a synchronized transaction identifier that may then be sent to, and used by, the one or more worker nodes 150.

As used in the present disclosure, an "identifier" may refer to a value, a set of values, an object representing a value, or an object representing a set of values. A transaction identifier, as used in this disclosure, is a identifier used to manage transactions in a distributed database system. In one implementation, a transaction identifier may refer to a particular value, such as a snapshotID or a commitID value. In particular examples, the transaction identifier, such as the snapshotID or the commitID, is, or includes, a timestamp. The timestamp is used to indicate a particular state of the database system. In some examples, the timestamp is a time. In other examples, the timestamp is a counter, which can be used to represent an order of operations in the database system or otherwise indicate different states of the database system, such as states at different time points. The timestamp, in specific examples, is an integer, such as an 8 byte integer. The timestamp may also refer to the state of the database system in a different manner.

In another implementation, the transaction identifier may refer to a collection of values, such as values selected from a snapshotID, a commitID, the snapshotID of a transaction having a minimum or maximum value currently visible to the database system or a particular node of the database system, or a value representing the state of a particular node in the database system.

The coordinator node 140 and the worker nodes 150 are in communication, such as through the network 120, and may send and receive communications to and from one another. As used herein, the term "send" to a destination entity refers to any way of transmitting or otherwise conveying data within a computer system or between two computer systems, whether the data is directly conveyed or conveyed through one or more intermediate entities. Similarly, the term "receive," such as to receive from a source entity, refers to the receipt of data within a computer system or between two computer systems, whether the data is received directly from the computer system of original transmission or received through one or more intermediate entities. When used in conjunction with "identifier," sending or receiving typically refers to sending or receiving the value or values associated with the identifier.

Although the coordinator node 140 may also store tables and partitions, in particular aspects of the present disclosure, a specific role of the coordinator node 140 is to act as a metadata master and a transaction coordinator for distributed database transactions. In one example, when a client 160 seeks to access metadata at a worker node 150, the worker node 150 retrieves the corresponding metadata from the coordinator node 140 and caches it locally. The cached metadata for a specific database object will be valid until the next DDL (data definition language) transaction is committed for that particular database object. Furthermore, being the transaction coordinator, the coordinator node 140 may decide about the commit of multi-node write transactions and mediate between the worker nodes 150 when they need to exchange transactional information with each other.

However, in at least some embodiments of the present disclosure, the coordinator node 140 need not be involved in every multi-node transaction. For example, the coordinator node may mediate certain multi-node read operations, but not others. In other examples, the coordinator node mediates at least certain multi-node read operations, but does not mediate multi-node write operations, or at least not all multi-node write operations. In yet further examples, the coordinator node mediates some, or all, multi-node read and write operations. In particular implementations, the coordinator node 140, or at least a coordinator node 140 having a fixed identity, is omitted. For example, the coordinator node 140 may be omitted and, if desired, one or more of the worker nodes 150 may periodically and temporarily assume one or more functions of a coordinator node 140, such as mediating the commit of a multi-node write transaction between the nodes 110 involved in the transaction.

While, when the system 100 includes a coordinator node 140, the nodes 110 are asymmetric, in some respects, the database nodes 110 are symmetric, in other respects. For example, each node 110 typically has its own persistency store 130 for log and checkpoint files. From the perspective of a client 160, an application may connect to any of the database nodes 110 and execute arbitrary read and write transactions. Tables can be partitioned and distributed across multiple database nodes 110. If a table has partitions defined via hash or range predicates, then those partitions can be distributed and stored in different nodes 110.

Although a client 160 may connect to any of the database nodes 110, it could be sub-optimal to connect to one of them randomly, or in a round-robin fashion, because the query's required tables or partitions may reside in a node 110 different from its connected execution node 110. If a query's target database objects are located in a different node 110, then the query execution may need to involve node-to-node communication through the network 120, which can be expensive in terms of the delay and resources involved. To minimize this mismatch between the execution location and the data location, a number of strategies can be used in the system 100.

Client-side routing is one strategy that can be used to reduce delay and use of other resources. When a given query is compiled (e.g., prepareStatement( ) in the Java Database Connectivity (JDBC) API), its desired locations are cached at the database client library. The next execution of the compiled query (e.g., executePrepared( ) in JDBC) is then, transparently for the application, routed, such as being directly routed, to one of the desired locations. If a query's target table is partitioned and distributed, a single desired location of the query typically cannot be decided at query compilation time, but it can be decided at query execution time by evaluating the given arguments corresponding to the table's partitioning specification.

While client-side statement routing is an approach that changes the execution location to resolve the execution/data location mismatch, it is also possible to change the data location by moving tables or partitions into a different location. The relocation may be triggered by the database administrator or automatically by an advisor tool, such as based on monitoring statistics of a given workload. Alternatively, tables can be co-partitioned in view of particular workload or database schemas in order to avoid expensive multi-node joins.

It is also possible to resolve the execution/data location mismatch by selectively replicating or caching tables/partitions. For example, if a join between two tables reflects a typical query pattern, replicating or caching the less-update-intensive table, or the smaller table, or both at a node, may improve system performance.

In at least certain implementations, some embodiments of the present disclosure can provide strong transaction consistency, which can be particularly useful for applications where weakened consistency would not be desirable. In at least some implementations, disclosed embodiments can comply with ACID properties and provide the same, or at least substantially the same, transactional consistency independently of whether the underlying database is distributed or not. In other implementations, some embodiments of the present disclosure can provide weaker consistency, or can switch between strong consistency and a weaker consistency regime.

Regarding the property isolation of the four properties in ACID, at least some database environments of the present disclosure can provide one or both of two variants of snapshot isolation, statement-level snapshot isolation (SSI) and transaction-level snapshot isolation (TSI). Snapshot isolation provides non-blocking read access against any concurrent write transactions.

In many examples described herein, a transaction consists of one or more statements (such as data manipulation language, or DML, statements), which can be, for example, either of read and write (e.g., INSERT, UPDATE, or DELETE). In SSI, each statement reads data from a snapshot of the committed data at the time the statement started. In TSI, each transaction reads data from a snapshot of the committed data at the time the transaction started, called the snapshot timestamp. In at least some database environments, SSI and TSI can co-exist, such as being configurable on a per user connection. The definitions of SSI and TSI imply that data once read, in a statement or a transaction, respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g., row IDs) without necessarily fully materializing them.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted to other concurrency control options like optimistic concurrency control or two-phase locking, a benefit of snapshot isolation in example implementations is that read queries can proceed without any query abort or any lock waiting situation, even though they read a database object which is being changed by other transactions.

In some implementations, disclosed protocols can have additional characteristics. For example, the protocol can provide improved performance for both read-oriented workloads and read/write-mixed workloads. Although optimistic concurrency control can perform acceptably for some read-oriented workloads, it can lead to a high abort ratio for applications which generate concurrent read and write transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

Another characteristic is that the cost of transaction control operations, such as snapshot timestamp assignment or transaction commit, may become more important for local statements/transactions than multi-node global statements/transactions due to their relative impact on overall performance. When a query touches tables distributed among multiple nodes, the query's execution time involves the network cost of exchanging the intermediate execution result of a node, thus the increase in the transaction control operations could be relatively trivial. However, if a query does not need to involve any network interaction for its own query processing, then a network roundtrip added only for the transaction control operation, for example, can affect the overall performance significantly. Typically, a large fraction of simple, but highly concurrent, queries (as typically observed in OLTP applications), run as single-node local queries. For example, in a multi-tenant database, tables can be partitioned reasonably well by tenant ID, leading naturally to node-local query execution.

In some aspects of the present disclosure, a database environment includes a table having database records. A new version of a record is created on each update operation instead of overriding the existing record version. Even for record deletion operations, a new version header is typically created with an empty payload instead of deleting the existing record right away. When creating a new record version, a versioning identifier, such as a version timestamp, representing the version creation time (the commit time (e.g., commit ID) of the transaction creating the version), is stored, such as in a version header. The versioning identifier may be, or may be used as, all or part of a transaction identifier.

In a particular implementation, the version timestamp is derived from a global transaction identifier, such as a transaction commit timestamp, maintained by a central transaction manager (which may be, for example, the coordinator node 140 of FIG. 1) which will be incremented on each commit of a write transaction. According to a particular example, the versions of a single record are chained to each other in a sorted order, such as by their version timestamps. Older versions in the version chain can be garbage-collected when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context may be maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under such a snapshot isolation implementation.

Figure 2:
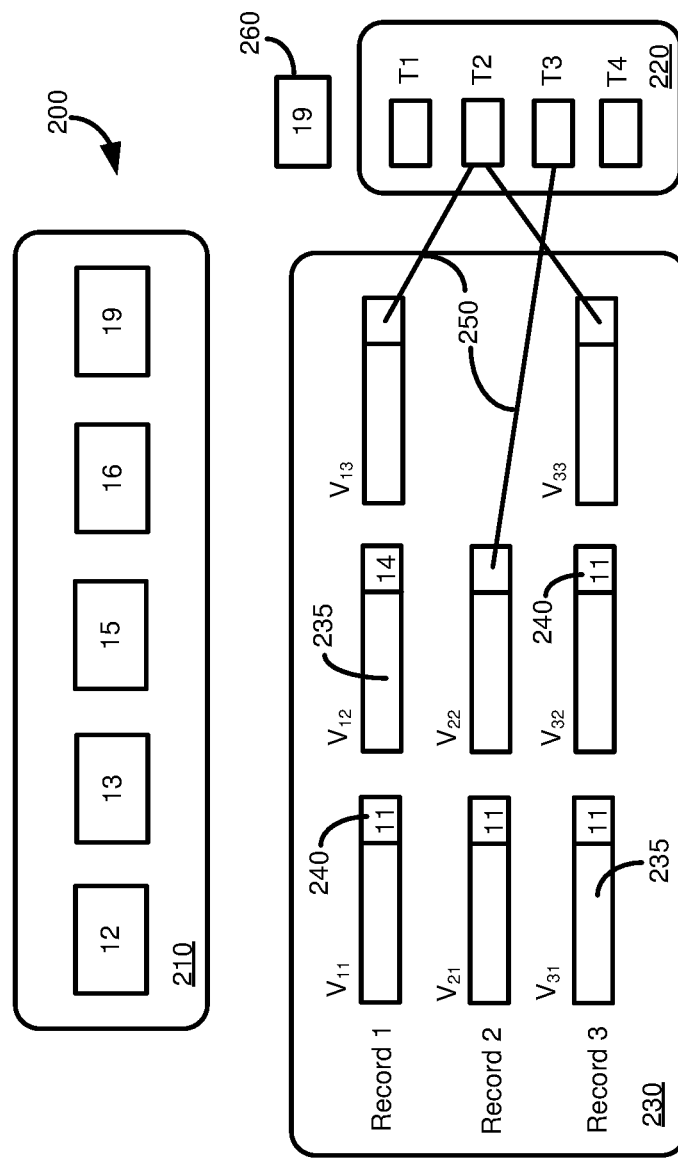
FIG. 2 is a diagram depicting an architecture of a transaction context providing version space management that may be used in at least certain implementations of a disclosed distributed transaction protocol.

FIG. 2 depicts an architecture 200 illustrating a transaction context providing version space management. The architecture 200 includes a snapshot timestamp store 210 that stores five active timestamps 12, 13, 15, 16, and 19. Architecture 200 further includes a transaction context store 220 for four active write transactions, T1, T2, T3, T4, each with their own transaction context entry. A record chain store 230 holds three database records, Record 1, Record 2, and Record 3, each with its own version chain of record versions 235. Each record version 235 includes a version timestamp 240.

As shown, from the viewpoint of a snapshot whose snapshot timestamp is 12, $V_{11}$ and $V_{21}$ are visible (because their version timestamps are less than the snapshot timestamp) but the other record versions 235 are not. $V_{13}$, $V_{22}$, and $V_{33}$ do not have their version timestamps yet, because their write transactions are not yet committed. Under this transaction state, the record versions store a pointer 250 to the corresponding transaction context entries ($T_2$ and $T_3$). Once $T_2$, for example, commits, then the transaction commit timestamp (19, as shown) of the transaction manager 260 at that time is copied to the transaction context entry 220, thus providing visibility atomicity indirectly. Note that the data structures in FIG. 2 are provided to give a conceptual overview, but their actual implementation can be different. For example, depending on whether the corresponding table is a row store or a column store, both of which may be supported in a single database system, the storage layout of the record versions may be different.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

Example 3—Distributed Snapshot Isolation

This Example 3 describes situations that can arise in distributed transaction processing, and also describes aspects of the present disclosure that may be used in addressing such situations. Table 1 provides a set of symbols that may be used to describe a distributed database transaction protocol.

TABLE 1

Notations

| Symbol | Description |
|---|---|
| CTS | Transaction commit timestamp of a transaction manager, incremented when a write transaction commits |
| GCT | CTS at the coordinator node |
| $LCT_i$ | CTS at a worker node i |
| $CID(T_i)$ | Commit ID of a write transaction $T_i$, assigned from GCT or LCT when $T_i$ commits |

TABLE 1-continued

Notations

| Symbol | Description |
| --- | --- |
| pCID($T_i$) | Precommit ID of a write transaction $T_i$, assigned from GCT or LCT when $T_i$ precommits |
| Status($T_i$) | Status of a write transaction $T_i$, either of {Unused, Active, Precommitted, Committed, Aborted} |
| TID($T_i$) | Transaction identifier of a transaction $T_i$ |
| STS(Si) | Snapshot timestamp of a snapshot $S_i$, assigned from GCT or LCT when the snapshot (statement or transaction) starts |

In at least certain implementations, a disclosed protocol can provide the same level of transactional consistency regardless of how many nodes the database is partitioned into. For example, a database environment may evolve from a single-node system to a multi-node distributed system, such as to handle higher workloads or larger database volumes. It may be undesirable for users to change their own application logic and adapt it for a potentially weaker consistency level provided by the database engine. This Example 3 describes two consistency properties of distributed database environments that can be addressed by at least certain distributed database protocols of the present disclosure.

According to the principle of visibility atomicity, a transaction's changes should be visible to another concurrent snapshot in an atomic way: either completely visible or not. Achieving visibility atomicity under snapshot isolation in a distributed database environment can be difficult because the record versions created by a write transaction can be distributed across worker nodes. For example, for a multi-node write transaction, if each updated node is committed one by one, then the changes of a node can be visible earlier to another concurrent reader, but others may not be visible to the same reader.

Figure 3:
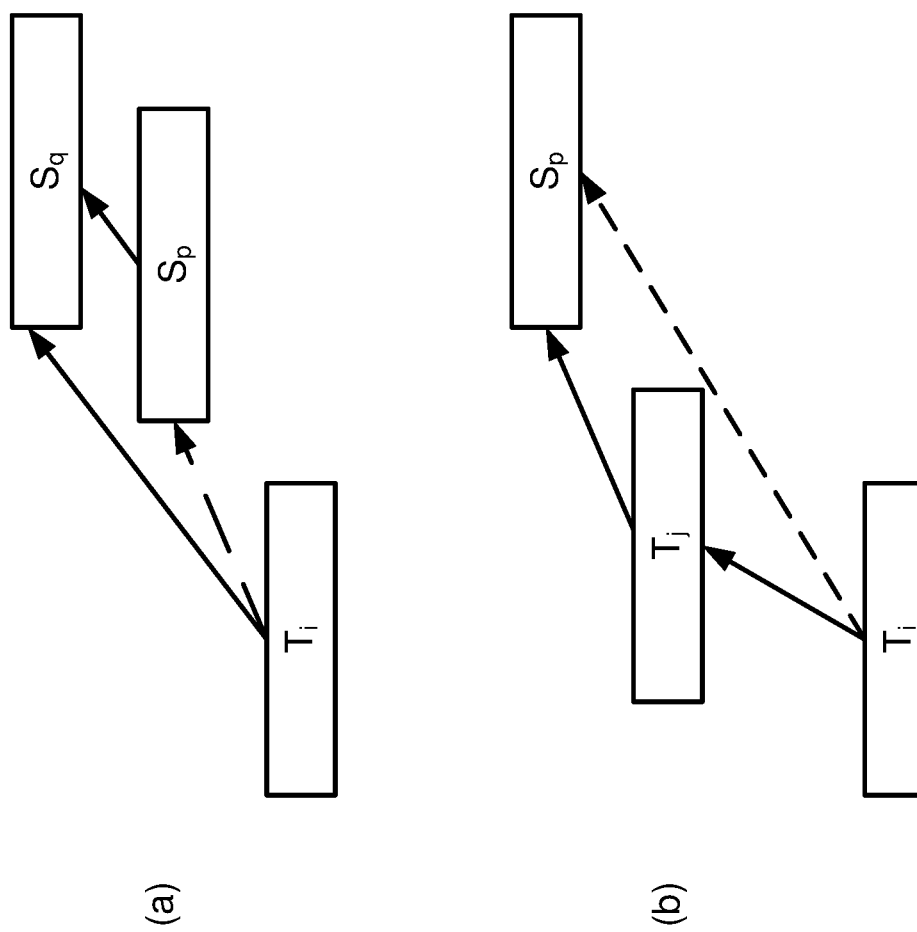
FIG. 3 is a diagram illustrating properties of snapshot monotonicity that may be provided by at least certain disclosed innovations with reference to an arbitrary pair of snapshots and an arbitrary pair of write transactions.

According to the principle of snapshot monotonicity, a transaction protocol is said to ensure snapshot monotonicity if all of the following conditions (visually represented in FIG. 3) are met for an arbitrary pair of write transactions, $T_i$ and $T_j$, and an arbitrary pair of snapshots, $S_p$ and $S_q$:

If $T_i$'s changes were visible to $S_q$, and $S_q$ was started after $S_p$'s start, then $T_i$'s changes should be visible to $S_p$ as well (FIG. 3(a)).

If $T_i$'s changes were visible to $S_p$, and $T_j$ committed after $T_i$'s commit, then $T_i$'s changes should be visible to $S_p$ as well (FIG. 3(b)).

Snapshot monotonicity is not represented by traditional ACID property definitions. However, it is a feature that may be appreciated by users. For example, assume a SalesOrder processing component in a business application inserted a record into a database table Tab1 by using a transaction $T_1$, and then it notified the event to a SupplyAvailabilityCheck processing component via a messaging protocol inside an application server after $T_1$ is committed. The SupplyAvailabilityCheck processing component then inserts a new record into a table Tab2 by using another transaction $T_2$. Then, it will be expected that the inserted record by SalesOrder processing (into Tab1 by $T_i$) should be visible to an analytic query which joins the tables Tab1 and Tab2 if the inserted record by SupplyAvailabilityCheck processing (into Tab2 by $T_2$) was visible to the join query.

Example 4—Snapshot Management

This Example 4 describes how, according to one aspect of the present disclosure, a snapshot timestamp (STS) is assigned to a snapshot (a statement under SSI or a transaction under TSI), how the STS is used for a visibility decision by the snapshot, and how the garbage versions are detected based on STS values. Although this Example 4 generally describes the protocol being used with SSI, the protocol can be applied in other contexts, including under TSI.

Figure 4:
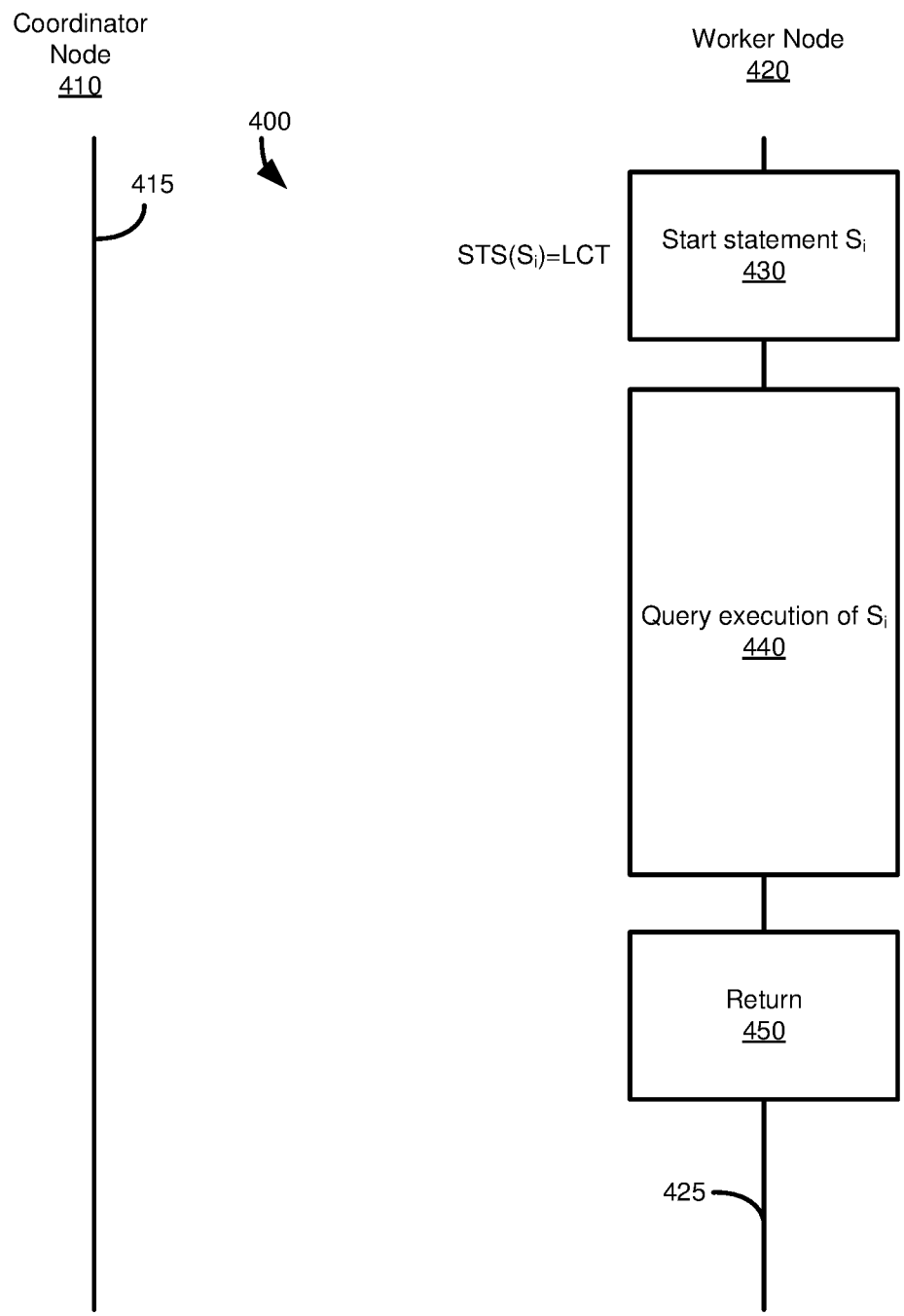
FIG. 4 is a diagram illustrating operations occurring at a coordinator node and a worker node for a local snapshot of the worker node.

FIG. 4 illustrates a scenario 400 illustrating how a STS is assigned to a local statement. In the scenario 400, a system includes a coordinator node 410 with an execution timeline 415 and a worker node 420 with an execution timeline 425. When a statement, $S_i$, starts in block 430, it gets its STS from its local synchronization identifier (such as a local commit timestamp (LCT)) maintained at worker node 420, not from the global synchronization identifier (such as a global commit timestamp (GCT)) maintained by the coordinator node 410. This is possible because the LCT of the worker node 420 is synchronized with the GCT maintained by the coordinator node 410 whenever a write transaction commits in the worker node 420. Throughout the statement execution, block 440, the same STS value is used to determine the visibility of a candidate record version. At operation 450, the worker node 420 returns query results to the database client which initiated the query.

Figure 5:
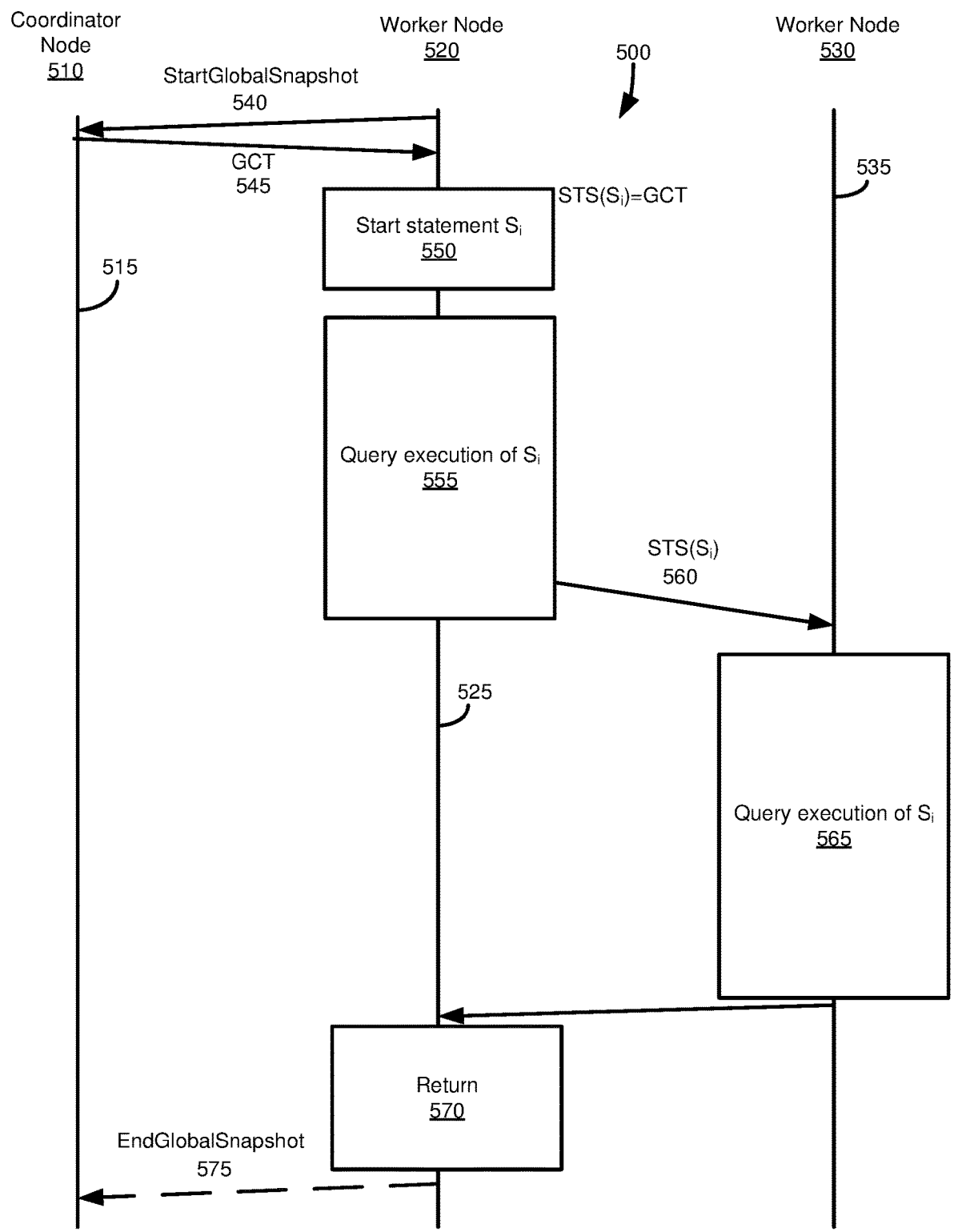
FIG. 5 is a diagram illustrating operations occurring at a coordinator node and first and second worker nodes for a global snapshot, under which statements at each of the first and second worker nodes are executed.

FIG. 5 illustrates a scenario 500 depicting STS assignment of a multi-node statement executable at worker nodes 520, 530 having respective execution timelines 525, 535. Execution of the statement $S_i$ is facilitated by a coordinator node 510 having an execution timeline 515. To provide visibility atomicity across multiple worker nodes 520, 530, the statement timestamp is acquired at worker node 520 from the coordinator node 510 by the worker node 520 sending a StartGlobalSnapshot request 540 to the coordinator node 510 for a global transaction identifier maintained by the coordinator node. The STS (corresponding to the transaction identifier, such as the GCT) assigned by the coordinator node 510 is sent to the worker node 520 in communication 545 and can be used for transactional access to any node, because all the worker-side transaction commit operations inform the coordinator node 510 synchronously during their commit operations.

In at least certain implementations of the present disclosure, including, but limited to, this Example 4, "maintaining" an identifier includes generating the identifier and assuming responsibility for the correctness of the identifier. For example, a coordinator node may be responsible for generating a global timestamp and incrementing it as appropriate to reflect the correct state of a database system. "Sending an identifier" or "receiving an identifier," in at least certain implementations, refers to sending or receiving, respectively, the current value of the identifier.

In particular implementations of the systems in the scenarios of FIGS. 4 and 5, the snapshot ID is an integer, such as an eight byte integer. In a specific example, the snapshot ID is derived from, or the same as, the LCT (which, if the node 410 is a coordinator node, is the global commit timestamp (GCT)).

After receiving the STS, the STS is assigned to the statement $S_i$ in block 550, which then executes in block 555. The statement $S_i$ carries the assigned STS, such as in communication 560, when it needs to be executed in another worker node, such as worker node 530, throughout its statement execution (as shown in block 565 for worker node 530). At the end of the statement execution, such as in return block 570 of execution timeline 525, an asynchronous request is made to the coordinator node 510 by the worker node 520 using EndGlobalSnapshot request 575, which can be used, for example, for garbage collection purposes.

Making a synchronous network I/O to the coordinator to receive the global STS adds an additional cost (in both time and resources) for a multi-node statement. As previously mentioned, this cost can be minimized by grouping the requests from concurrent global queries into a single network call.

Under SSI, at least in some implementations, it can be decided at the statement start time whether a statement will use the local STS or the global STS. Using client-side statement routing, the target location information of a compiled query is already maintained. Before query execution, it can be determined whether the query will access only a single node or multiple nodes retrieved from a pre-compiled query plan. For queries whose target location cannot be determined at query compilation time (e.g., a query for a partitioned table not containing the partitioning key in its WHERE clause), in a particular implementation, the query is optimistically classified as a local query. If this decision turns out to be not correct, the query can be re-started by substituting the STS with the current GCT. Under SSI, such query restart can be done without necessarily returning any error to the client application. Under TSI, a database environment operating an implementation of the disclosed distributed transaction protocol may be configured to mostly employ the global snapshot timestamp, as it may not be certain which types of statements will be executed within the transaction's life cycle.

If node 420 fails while the query is executed in the scenario of FIG. 4, then the query is automatically aborted as the node 420 is restarted. In the scenario of FIG. 5, if node 530 fails while the query is executed at node 520, the query is restarted or aborted because the record versions corresponding to the query's assigned global STS might not be available any more in the restarted node 530. This case can be detected by maintaining a per-node watermark at each worker node 520, 530, which is incremented whenever the corresponding worker node 520, 530 is restarted. In a specific example, the watermark is an identifier, such as an integer. After a worker node is restarted, its watermark value is also cached at the coordinator node 510, and then the set of available per-node watermark values are transmitted jointly to a global query when the query gets the global STS value from the coordinator node. Therefore, in at least certain implementations of the disclosed distributed transaction protocol, the communication 545 from the coordinator node 510 to the worker node 520 includes at least the GCT and the watermark identifiers cached at the coordinator node. In some examples, the GCT and watermark are separate identifiers, including transaction identifiers. In other examples, the GCT and watermark values are part of a single transaction identifier. Whenever the execution of a global query is shipped to a new worker node 520, 530, it is checked whether the worker node has the same watermark value as the query's informed watermark value.

Algorithm 1 shows how a statement checks if a record version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7).

---
Algorithm 1 Visibility decision algorithm: check if a record
version V should be visible to a snapshot S or not
---

```
1:  while TRUE do
2:      if V's status is Committed then
3:          if V's CID ≤ STS(S) then
4:              return TRUE
5:          else
6:              return FALSE
7:          end if
8:      else if V's status is Aborted then
9:          return FALSE
10:     else if V's status is Active then
11:         return FALSE
12:     else if V's status is Precommitted then
13:         if V's pCID ≥ STS(S) then
14:             return FALSE
15:         else
16:             wait until V's status becomes Committed or
                Aborted
17:         end if
18:     end if
19: end while
```

In addition to the basic visibility rules, the following extensions are provided. As previously mentioned, and as recited in Algorithm 1, at least certain aspects of the present disclosure provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of the disclosed transaction management protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write operations and thus should only view records that were available when the query was started, can be pruned. More specifically, if STS(S) is smaller than or equal to pCID(T) for a write transaction T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

In at least certain implementations of the present disclosure, garbage collection is executed independently in each worker node, but it considers not only the queries running in its local node, but also multi-node queries which were started at different worker nodes but can potentially access the local node. In order to reflect such global queries during local garbage collection, the coordinator node can maintain all the active global queries by watching the incoming StartGlobalSnapshot calls and EndGlobalSnapshot calls. When local garbage collection starts at a worker node, it gets the minimum STS value of active global queries, called MinActiveGlobalSTS, from the coordinator node, and also the minimum STS value of its active local queries, called minActiveLocalSTS, from its local node. Taking the minimum value of MinActiveGlobalSTS and MinActiveLocalSTS, the garbage collector finds out the record versions that have version timestamps which are smaller than the minimum value by traversing the record version chains.

To maintain the complete set of active global queries at the coordinator, StartGlobalSnapshot should typically be executed synchronously from a worker node to the coordinator node. However, since StartGlobalSnapshot is already used to get the global STS of a global query, it does not add additional latency to the global query. In particular implementations of the disclosed method, the overhead of EndGlobalSnapshot is minimized by making it as an asynchronous call, as shown in FIG. 5. Although the asynchronous call can result in the MinActiveGlobalSTS value being slightly out of date, which can result in slightly delayed garbage collection, it does not typically otherwise affect the overall performance of transaction processing.

Example 5—Periodic Synchronization of Local Transaction Identifiers of Worker Nodes by Coordinator Node As described above, many snapshot isolation protocols involving multiple worker nodes rely on a coordinator node to provide, or synchronize, the transaction identifiers, such as timestamps, of the worker nodes. As the number of worker nodes increases, this communication with the coordinator node can create a bottleneck and degrade the performance of the database system. This Example 5 describes a protocol in which the coordinator node periodically synchronizes the transaction identifiers of the worker nodes, rather than having the worker nodes inform the coordinator node of every local write transaction on the worker node, and without the local nodes requesting a global transaction identifier for a multi-node snapshot. As will be explained in more detail, local statements may execute at the worker nodes using the current transaction identifier, such as the local commit timestamp, of the respective worker nodes. However, global (multi-node) statements are held at the worker node until the next transaction identifier synchronization cycle by the coordinator node is completed. Similarly, local write transactions may be committed by the worker node without coordination with the coordinator node.

Figure 6:
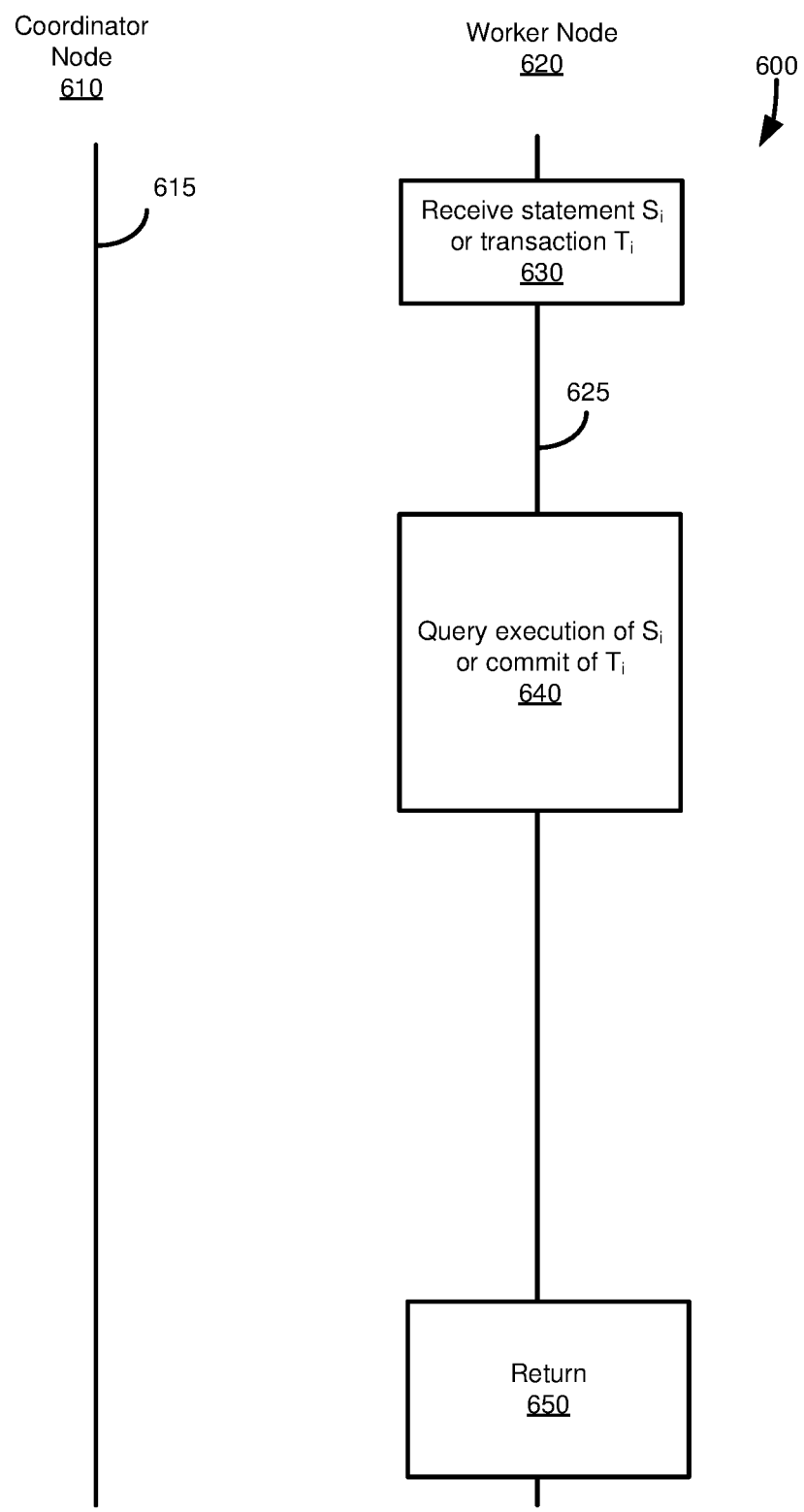
FIG. 6 is a diagram illustrating operations occurring at a coordinator node and a worker node for a local snapshot of the worker node.

With reference to FIG. 6, a scenario 600 involves a system that includes a coordinator node 610 and a worker node 620, with respective execution timelines 615, 625. A statement $S_i$ which only accesses records located at worker node 620, or a transaction $T_i$ (with one or more local read or write operations on the worker node 620), is received by the worker node 620. In this situation, statement $S_i$ or transaction $T_i$ can start at the worker node 620 in block 630 using a local transaction identifier, such as a local commit timestamp (LCT), of the worker node 620. The worker node 620 executes the read operations of the statement $S_i$ or transaction $T_i$, or executes the write operations and commits the transaction $T_i$, at the worker node 620 in process 640, and results, or a commit acknowledgement, are returned to the client in block 650. So, for local-only read or write operations, the worker node 620 does not need to communicate with the coordinator node 610 before starting the query, executing read or write operations, and committing the write operations.

Figure 7:
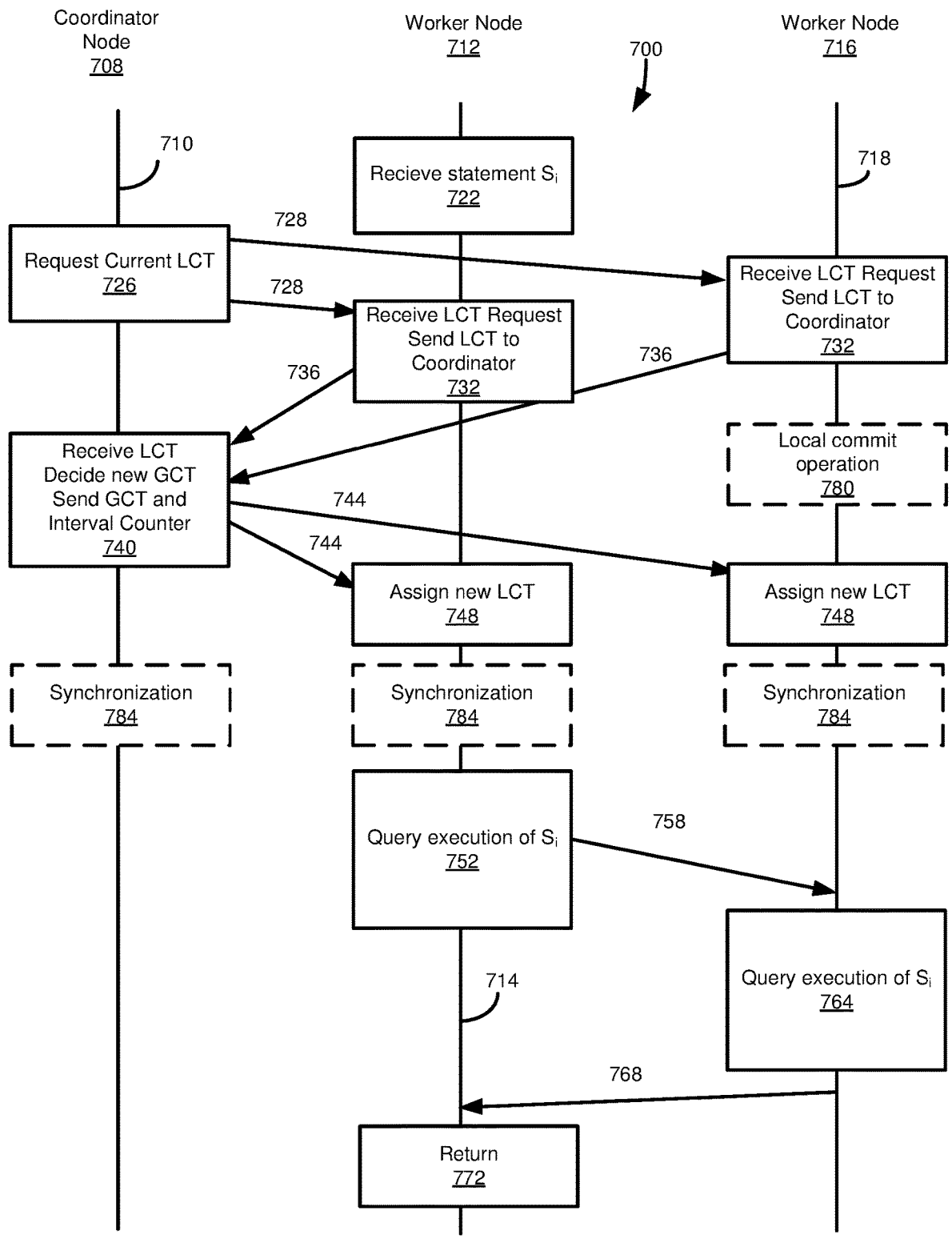
FIG. 7 is a diagram illustrating operations occurring at a coordinator node and first and second worker nodes during synchronization of transaction identifiers of the coordinator node and the first and second worker nodes.

FIG. 7 illustrates a scenario 700 in a system that includes a coordinator node 708, a worker node 712, and a worker node 716, with respective execution timelines 710, 714, 718. The coordinator node 708 maintains a global transaction identifier, such as a commit timestamp, and, in particular examples, a synchronization interval counter.

Worker node 712 receives a multi-node statement in block 722 that includes read operations. As the statement $S_i$ is a global statement, its execution is held until the local transaction identifier, such as the LCT of the worker node 712, is synchronized with a global transaction identifier maintained by the coordinator node 708. The remainder of FIG. 7 will be described with respect to synchronizing the LCT of the worker nodes 712, 716 with the GCT of the coordinator node 708. However, the scenario 700 may be used with other types of transaction identifiers. In addition, although FIG. 7 illustrates synchronization of LCTs in processing a multi-node statement with read operations, an analogous synchronization protocol may be used with local write operations at the worker nodes 712, 716.

In block 726, the coordinator node 708 begins a new synchronization cycle by sending requests 728 to each of the worker nodes 712, 716 for the current value of their LCT. In at least some implementations, the coordinator node 708 starts a new synchronization cycle at periodic intervals, such as at determined or predetermined intervals, including at regular intervals. In other implementations, the coordinator node 708 does not initiate synchronization cycles, but rather periodically receives the LCT values of the worker nodes 712, 716, such as receiving LCT values at, or receiving LCT values sent at, determined or predetermined intervals, including at regular intervals.

In some implementations, the communications 728 may be used to carry out functions in addition to initiating a synchronization cycle. For example, the communications 728 may include the current GCT value (such as a GCT value determined from a prior synchronization cycle or operation) and, if used, the value of the synchronization interval counter. In a particular case, the sending of the GCT in communication 728, based on LCT values obtained from prior communication with the worker nodes 712, 716, is used to initiate the next synchronization cycle. Including the GCT value, and optionally the synchronization interval counter, in the communications 728 can reduce the number of communications between the coordinator node 708 and the worker nodes 712, 716. It can also reduce the number of types of communications that need to be included in a system implementing the scenario of FIG. 7. In further examples, the communications 728 can include additional, or different, information.

The interval may be selected based on a number of factors, including the number of worker nodes in the database environment and the desired transaction throughput, which can be affected by delays in processing multi-node transactions while the worker nodes are waiting for the next synchronization cycle. For example, longer intervals between synchronizations may be used as the number of worker nodes increases, in order to reduce the amount of network communications with the coordinator node 708. However, longer intervals typically result in lower transaction throughputs. In various implementations, the synchronization interval is between about 0.25 milliseconds and about 2 seconds, such as between about 0.5 milliseconds and about 1 second, between about 0.75 milliseconds and about 500 milliseconds, between about 1 millisecond and about 200 milliseconds, between about 1 millisecond and about 50 milliseconds, or between about 1 millisecond and about 10 milliseconds. For example, the synchronization interval may be between 0.25 milliseconds and 2 seconds, such as between 0.5 milliseconds and 1 second, between 0.75 milliseconds and 500 milliseconds, between 1 millisecond and 200 milliseconds, between 1 millisecond and 50 milliseconds, or between 1 millisecond and 10 milliseconds. In specific examples, the synchronization interval is about 0.25, about 0.5, about 0.75, about 1, about 2, about 5, about 10, about 25, about 50, about 75, about 100, about 200, about 300, about 400, about 500, about 600, about 700, about 800, about 900, or about 1000 milliseconds, such as being 0.25, 0.5, 0.75, 1, 2, 5, 10, 25, 50, 75, 100, 200, 300, 400, 500, 600, 700, 800, 900, or 1000 milliseconds.

In further implementations, the synchronization interval is adjustable. For example, the synchronization interval may be manually set by a database administrator. In another example, a database system may dynamically adjust the synchronization interval, such as based on the number of worker nodes currently in the database system or the number or frequency of global statements. For example, if global statements are occurring more frequently, the database system may dynamically set a shorter synchronization interval to reduce the delay in processing global statements. Or, even if global statements are occurring frequently, and communications to the coordinator are creating a bottleneck, the synchronization interval can be dynamically increased (lengthened) to mitigate the bottleneck. On the other hand, if global statements are occurring less frequently, such as based on the type of use of the database systems, or simply during periods of low activity (such outside of working hours), the synchronization interval can be lengthened, which can save on power consumption and network traffic costs. In some examples, the synchronization interval may analyzed, such as by the coordinator node 708, after each synchronization cycle or operation is carried out, and modified if appropriate.

The worker nodes 712, 716 receive the requests 728 in blocks 732 and transmit their current LCT values to the coordinator node 708 in communications 736. Alternatively, the worker nodes 712, 716 can periodically (e.g., at a synchronization interval) transmit their current LCT values to the coordinator node 708 in communications 736 without the coordinator node 708 requesting the current LCT values (no block 726). In this approach, network traffic is reduced since the request messages from the coordinator node 708 are skipped. The synchronization interval can be set statically or dynamically as described above.

In yet further implementations, the synchronization of LCT values happens periodically, but need not happen at regular intervals. In some cases, synchronization is initiated by the coordinator node 708, or by one of the worker nodes 712, 716, such as based on particular criteria (such as the receipt by a worker node of a multi-node statement).

In process 740, the coordinator node 708 determines a new GCT value, such as by selecting the maximum of the LCT values received from the worker nodes 712, 716, or the maximum of the current GCT value maintained by the coordinator node 708 and the LCTs received from the worker nodes 712, 716. Once the coordinator node 708 determines the new GCT value, the coordinator node 708 updates the synchronization interval counter, if used, and sends the new GCT and, optionally, synchronization interval counter values to the worker nodes 712, 716 in communications 744. The GCT and interval counter values may be sent as separate transaction identifiers, or as, or as part of, a single transaction identifier.

In some implementations, communications 728 and 744 may be combined (including in a single network call from the coordinator node 708 to each worker node 712, 716). That is, the sending of the updated GCT (and, optionally, interval counter) may be combined with initiating a request for the LCT values of the worker nodes 712, 716 (and, at least in some examples, initiating a new synchronization operation). As discussed above, the communications 728 can include the GCT value, and, optionally, the synchronization interval counter value. Consolidating these communications can further reduce the number (and types) of network communications between the coordinator node 708 and the worker nodes 712, 716 as part of the synchronization process.

When the worker nodes 712, 716 receive the communications 744, they determine a LCT value to be used at the worker nodes 712, 716 in process 748. The LCT value determined by the respective worker nodes 712, 716 provides a snapshot for the read operations of the multi-node statement $S_i$. For example, each worker node 712, 716 may determine the LCT value by selecting the maximum value of the GCT sent by the coordinator node 708 and the current LCT value of the worker node 712, 716. In this way, the worker nodes 712, 716 may continue to commit local write operations during the synchronization process. If the local write operations result in the LCT of the worker node 712, 716 having a higher value than the GCT provided by the coordinator node 708 in communication 744, the worker node 712, 716 simply continues using its current LCT value. However, the synchronization processes provides that each worker node 712, 716 will have a LCT value that is at least as large as the largest LCT (or the largest of the LCT and GCT values) sent by the worker nodes 712, 716 in communications 728.

After determining the LCT value in process 748, the multi-node statement $S_i$ is executed on worker node 712 in block 752. A portion of statement $S_i$ that is executable at worker node 716 is forwarded to worker node 716 by worker node 712 in communication 758 with the LCT value assigned by the worker node 712 in process 748. The worker node 716 executes $S_i$ at block 764 and returns results to worker node 712 in communication 768. Executions results of $S_i$ are returned to the database client in process 772.

FIG. 7 shows periodic synchronization operations (between the coordinator node 708 and worker nodes 712, 716) that are interleaved with query receipt and processing operations. More generally, the periodic synchronization operations shown in FIG. 7 (including at least blocks 732, 740, and 748) happen periodically, regardless of whether a query has been received with one or more statements and one or more transactions to process. When a query is received, the worker nodes 712, 716 use the synchronization information provided with periodic synchronization.

Although the scenario of FIG. 7 shows a single timestamp synchronization operation before the multi-node statement is executed on worker node 712 at step 752, it can be beneficial to carry out more than one synchronization operation before executing the multi-node statement. As described above, at least certain implementations of this Example 5 allow local write operations to commit at a worker node 712, 716 without coordination with the coordinator node 708, and during the timestamp synchronization process. However, snapshot monotonicity may not be guaranteed in this situation.

For example, consider a scenario where worker node 712, 716 both originally have LCT values of 12. In optional block 780, a local commit operation executes on worker node 716, incrementing the LCT value of worker node 716 to 13. Assuming that 12 was selected as the GCT by the coordinator node 708 in step 740, and that no local write transactions were committed on worker node 712, in block 748, worker node 712 would use the LCT value of 12. However, worker node 716, selecting the greater of its own current LCT value and the GCT, would proceed using a LCT value of 13.

If a local statement was started on worker node 716 after block 748, it would be assigned a snapshot value of 13 and the local write operation committed in step 780 would be visible in the statement. However, if $S_i$ was executed at worker node 712 after block 748, it would have a snapshot value of 12, and local commit operation 780 on worker node 716 would not be visible to the query. This would not be consistent with the property of snapshot monotonicity discussed earlier, where if a transaction is visible to a first statement, it should also be visible to a second statement that was started later than the first statement.

If desired, a higher level of consistency can be provided, including the property of snapshot monotonicity, by carrying out the synchronization operation more than one time before a multi-node statement is executed. For example, optional block 784 illustrates one or more additional synchronization operations at the coordinator node 708 and the worker nodes 712, 716. Continuing the example above, assuming no other transactions were committed, after another synchronization operation in step 784, both worker nodes 712 and 716 would have LCT values of 13, and a statement at either worker node 712, 716 would see the same record versions. Thus, in at least some implementations, rather than waiting for an interval counter to be incremented by one before executing a multi-node statement, the execution of the multi-node statement is delayed until the interval counter has been incremented by more than one, such as being incremented by two, or being incremented by a larger value.

When execution of multi-node statements is delayed for more than one synchronization operation, in one implementation, the operations are carried out as described above. That is, each synchronization cycle may include a single synchronization operation and there may be an interval, including a periodic interval, between synchronization cycles. If desired, any delay in executing multi-node statements can be reduced by carrying out synchronization operations consecutively, such as without the interval described above, in a given synchronization cycle. For example, for the desired number of iterations, a worker node 712, 716 may send its LCT value to the coordinator node 708 as soon as it receives the new GCT (and, optionally, interval counter), or a LCT value request, from the coordinator node 708, and decides its updated LCT. In another example the worker nodes 712, 716 may consecutively initiate a synchronization operation for the desired number of iterations.

When consecutive synchronization operations are used in a single synchronization cycle, the interval periods between synchronizations cycles may correspond to the intervals described above for a single synchronization cycle. That is, for a synchronization cycle that includes two synchronization operations per cycle, two synchronization operations are executed consecutively during a cycle and then the next synchronization cycle does not begin until the interval has passed (or the next synchronization cycle is otherwise initiated).

At a high level, there are at least two different approaches for the worker nodes 712, 716 to start query processing. In one approach ("wait approach", described in this Example 5), after receiving a multi-node statement $S_i$, the respective worker nodes 712, 716 wait for the next synchronization with the coordinator node 708 before executing the statement $S_i$. In another approach ("no-wait approach", described in Example 6), after receiving a multi-node statement $S_i$, the respective worker nodes 712, 716 use the most recently received synchronization information from the coordinator node 708 when executing the statement $S_i$.

The protocol described in FIG. 7 may be modified if desired. For example, the coordinator node 708 was described as incrementing a synchronization interval counter, such as incrementing an integer value. In other implementations, in the wait approach, the worker nodes 712, 716 can determine when a synchronization cycle has been completed, and the processing of pending multi-node statements can be started, in another manner. For example, a Boolean variable may be set to false after pending multi-node statements have been started at a worker node 712, 716 after synchronization with the coordinator node 708. While the variable is false, new multi-node statements are again held at the worker node 712, 716. When another synchronization with the coordinator node 708 is carried out, the variable is set to true, pending statements are processed, and the variable is again set to false. Thus, execution of pending multi-node statements "waits" until synchronization completes with the coordinator node (e.g., a new GCT is received). The wait approach can add delay to query processing in an amount that depends on the synchronization interval.

In the no-wait approach, described in Example 6, the worker nodes 712, 716 process a multi-node statement using the current (most recent) synchronization information from the coordinator node 708. This avoids the added delay of the "wait approach," but transactional consistency is not guaranteed. In particular, a change to data at one worker node might be visible at that worker node but not visible at another worker node. So long as the synchronization interval is sufficiently short, however, such occurrences may be limited. In some cases, such an occurrence can be handled by canceling and restarting a query.

In at least certain implementations of this Example 5, the communications 736 may include information in addition to the values of the transaction identifiers of the worker nodes 712, 716. For example, in addition to sending the value of their transaction identifiers, which typically represents the largest active transaction identifier at the worker nodes 712, 716, the worker nodes 712, 716 may also send in communications 736 minimum transaction identifier values currently in use by the worker nodes 712, 716. The coordinator node 708 may use the minimum active transaction identifier values to facilitate garbage collection—the removal of record versions that are longer needed by any active query. In some examples, the coordinator node 708 sends additional information to the worker nodes 712, 716 in communications 744, such as the minimum active transaction identifier value in the scenario 700. The worker nodes 712, 716 may then remove record versions older than this minimum value.

As the protocol of this Example 5 can involve less frequent communication between the coordinator node 708 and the worker nodes 712, 716, there can be some delay in garbage collection. However, combining garbage collection information with the communications 736, 744 can avoid sending this information in separate communications, which can reduce network traffic in the scenario 700, including reducing the networking and processing burdens at the coordinator node 708.

In an alternative implementation, if a portion of the multi-node query is executable at a remote worker node (a worker node other than the worker node that originally received the query), without prior processing by the node which received the statement, it may be forwarded to the remote node without waiting for a new synchronization cycle. However, the portion of the statement executable at the remote node is not executed until the next synchronization cycle has completed. This scenario is illustrated in the scenario 800 of FIG. 8. As with FIG. 7, the description of FIG. 8 discusses synchronization of the LCT values with the GCT of a coordinator node, but other transaction identifiers may be used and synchronized in an analogous manner.

In the scenario 800, a system includes a coordinator node 808, a worker node 812, and a worker node 816, having respective execution timelines 810, 814, 818. In block 822, worker node 812 receives a multi-node statement $S_i$ that includes read operations. A portion of the statement $S_i$ is determined to be executable at worker node 816. Without waiting for synchronization of a transaction identifier with the coordinator node 808, worker node 812 forwards all or a portion of statement $S_i$ to worker node 816 in communication 826. The communication 826 may include additional information. For example, if a synchronization counter is used, the value of the synchronization counter when worker node 812 received statement $S_i$ may be sent to worker node 816 in communication 826. In this way, the worker node 816 may execute $S_i$ when the synchronization counter known to worker node 816 is larger than the value sent in communication 826 (but using the new GCT sent to the worker node 816 by the coordinator node 808).

Worker node 816 receives the statement $S_i$ in block 830. In this implementation, $S_i$ is not executed at worker node 812 or worker node 816 until the next synchronization cycle is completed. In other examples, $S_i$ may be executed by the worker node 812 prior to synchronization, as long as its results do not depend on execution of $S_i$ by the worker node 816.

In block 834, the coordinator node 808 starts a new synchronization cycle by sending requests 838 to worker nodes 812, 816 for their current LCT values. As described above in the discussion of FIG. 7, the request 838 can include additional information, including the GCT and, optionally, a synchronization interval counter value. The worker nodes 812, 816 receive the requests 838 in block 842 and send their current LCT values to the coordinator node 808 in communications 846. Alternatively, the worker nodes 812, 816 can periodically (e.g., at a synchronization interval) transmit their current LCT values to the coordinator node 808 in communications 846 without the coordinator node 808 requesting the current LCT values (no block 834).

In process 850, the coordinator node 808 determines a new GCT, such as described above. As described above in the discussion of FIG. 7, in some implementations, the communications 838 may be combined with the communications 854. The updated GCT value is sent to the worker nodes 812, 816 in communications 854. When the worker nodes 812, 816 receive the communications 854, they determine a LCT value, such as described above, in block 858. The LCT value determined by the respective worker nodes 812, 816 provides a snapshot for the read operations of the multi-node statement $S_i$. The worker nodes 812, 816 then execute $S_i$ in blocks 862, 866, respectively. Worker node 816 returns query results to worker node 812 in communication 870. Worker node 812 returns query results to a database client in block 874.

Figure 8:
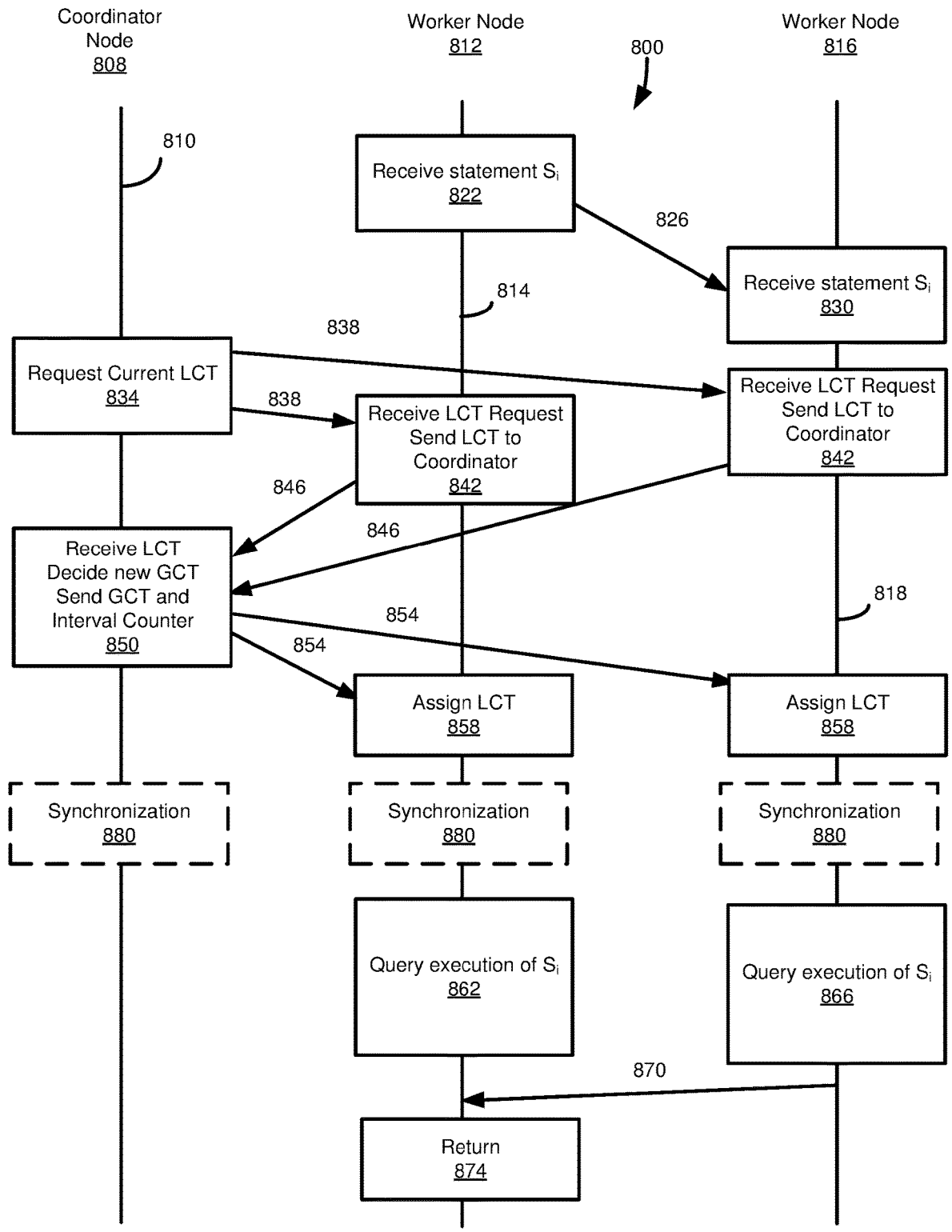
FIG. 8 is a diagram illustrating operations occurring at a coordinator node and first and second worker nodes during synchronization of transaction identifiers of the coordinator node and the first and second worker nodes.

Like FIG. 7, FIG. 8 shows periodic synchronization operations that are interleaved with query receipt and processing operations. More generally, the periodic synchronization operations shown in FIG. 8 (including at least blocks 842, 850, and 858) happen periodically, regardless of whether a query has been received with one or more statements and one or more transactions to process. When a query is received, the worker nodes 812, 816 use the synchronization information provided with periodic synchronization. Depending on implementation, the worker nodes 812, 816 can use a wait approach (wait for the next synchronization with the coordinator node 808 before executing the statement $S_i$) or a no-wait approach (use the most recently received synchronization information from the coordinator node 808 when executing the statement $S_i$), as described above.

Additionally, also like FIG. 7, the scenario of FIG. 8 may include more than one synchronization operation before execution of the multi-node query. For example, optional block 880 indicates one or more additional synchronization operations.

Figure 9:
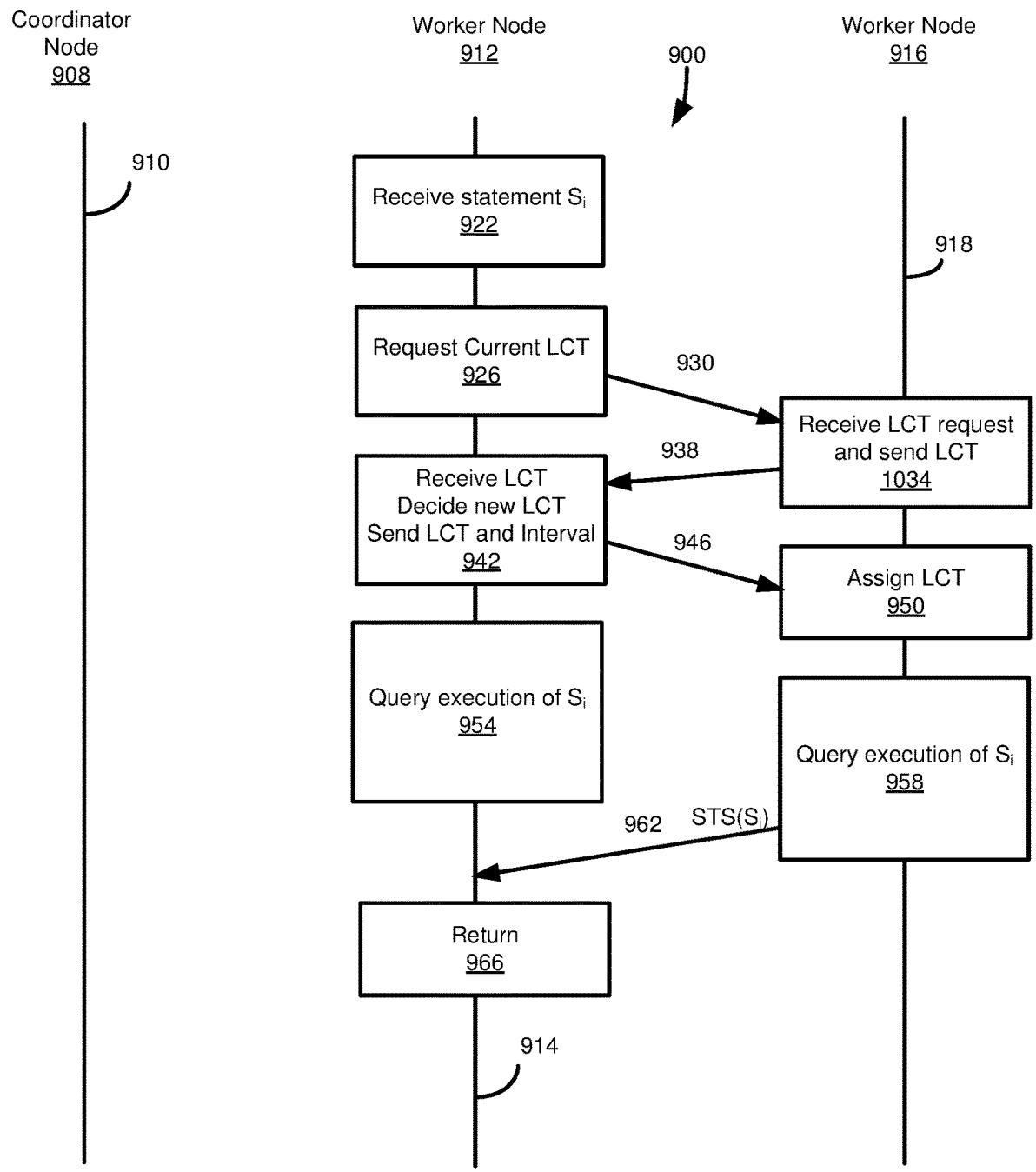
FIG. 9 is a diagram illustrating operations occurring at a coordinator node and first and second worker nodes during synchronization of transaction identifiers of the first and second worker nodes.

FIG. 9 illustrates another implementation of the protocol of this Example 5. Again, FIG. 9 discusses the synchronization of LCT and GCT values, but other transaction identifiers may be used and synchronized in a similar manner.

FIG. 9 illustrates a scenario 900 in a system having a coordinator node 908, a worker node 912, and a worker node 916, with respective execution timelines 910, 914, and 918. In block 922, worker node 912 receives a statement $S_i$. The worker node 912 is able to determine, such as from a query plan associated with $S_i$, that $S_i$ will access records maintained by worker node 916. In this implementation, worker nodes 912 and 916 can communicate directly to coordinate timestamps without waiting for the synchronization process mediated by the coordinator node 908.

For example, in process 926, the worker node 912 starts the timestamp coordination process by sending a request 930 to the worker node 916 for the LCT of the worker node 916. The worker node 916 receives the communication 930 in block 934 and sends its LCT to the worker node 912 in communication 938. In block 942, the worker node 912 determines a LCT value, such as choosing the maximum LCT of the worker node 912 and the worker node 916. This LCT value is then sent to the worker node 916 by the worker node 912 in communication 946. In some examples, as shown, the communication 946 also includes the statement $S_i$. In other examples, $S_i$ is sent to the worker node 916 by the worker node 912 in a separate communication.

In block 950, the worker node 916 determines a new LCT value. In some cases, the worker node 916 selects the LCT value sent in communication 946 as the new LCT value for the worker node 916. In other cases, the worker node 916 selects as a LCT value for the worker node 916 the larger of the current LCT value of the worker node 916 and the LCT value received in communication 946.

Query $S_i$ is executed on worker nodes 912 and 916 in blocks 954 and 958. Query execution results from worker node 916 are returned to the worker node 912 in communication 962. Worker node 912 returns query results to a database client in process 966.

As described above, in particular implementations of this Example 5, a transaction identifier synchronization protocol of this Example 5 may be used with a commit protocol to commit write operations (such as transactions including one or more DML statements) local to a worker node, such as worker nodes 712, 716 of FIG. 7, without communication or synchronization with the coordinator node, such as the coordinator node 708. This can further reduce network traffic at the coordinator node. As the LCT values of the worker nodes are periodically synchronized with the coordinator node, the coordinator node eventually becomes aware of local write operations at the worker nodes.

Example 6—Commencement of Multi-Node Statements without Waiting for New Synchronization According to another aspect of the present disclosure, protocols are provided that allow a multi-node statement to be executed without waiting for synchronization of a transaction identifier between the worker nodes and the coordinator nodes, or among the worker nodes themselves. For example, periodic synchronization may be happening in the background. In particular implementations, the protocol includes periodically synchronizing the transaction identifiers, such as commitIDs (for example, a timestamp) of the worker nodes and a coordinator node. For example, the protocol of Example 6 may use the protocol described in Example 5 to synchronize transaction identifiers used for snapshot isolation at a periodic interval. Statements can be executing without waiting for the most current synchronization transaction identifier, instead using the most recently received synchronization transaction identifier as in the "no-wait approach" described in Example 5.

Figure 10:
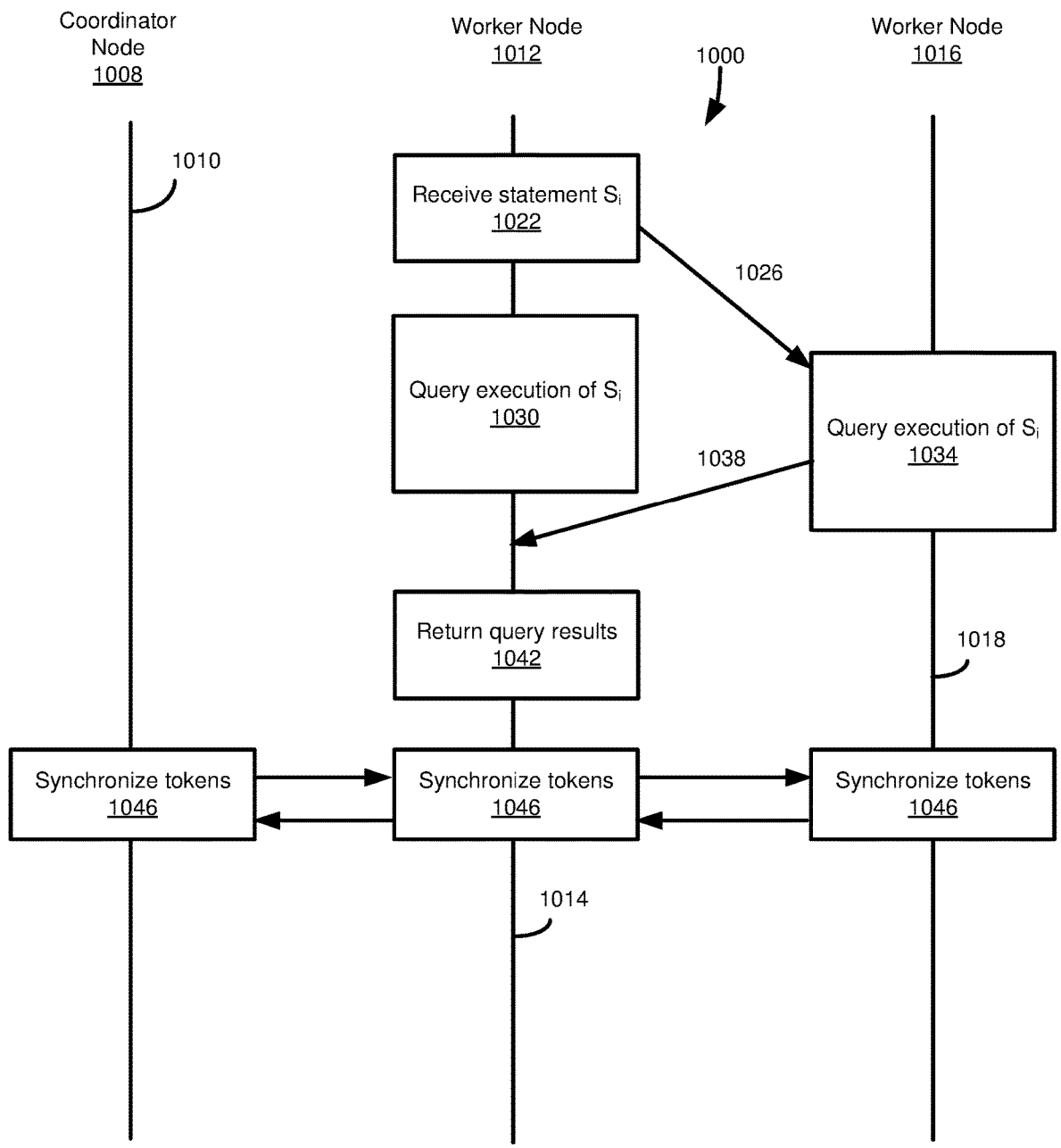
FIG. 10 is a diagram illustrating operations occurring at a coordinator node and first and second worker nodes during execution of a multi-node database statement without requiring communication by the first or second worker nodes with the coordinator node.

FIG. 10 illustrates a scenario 1000 of this Example 6, depicting a particular scenario using a protocol according this Example 6. In the scenario 1000, a system includes a coordinator node 1008, a worker node 1012, and a worker node 1016, with respective execution timelines 1010, 1014, 1018. In block 1022, worker node 1012 receives a multi-node statement $S_i$ that includes read operations. Without waiting to synchronize transaction identifiers, such as commit timestamps, between the worker nodes 1012, 1016, or between the coordinator node 1008 and the worker nodes 1012, 1016, the worker node 1012 sends $S_i$, or portions of $S_i$ executable at worker node 1016, to worker node 1016 in communication 1026.

In some cases, statement $S_i$ may include an identifier that indicates that a protocol of this Example 6 should be used, such as being used rather than another protocol, for example, rather than strictly following the protocol of Example 5. For example, when a database session is initiated, it can be decided, such as automatically by the database system, for example, based on settings made by a database administrator, or by a user, that the session may use a protocol of this Example 6. The database or user may, for example, determine that it is not significant whether query results include some possibly outdated information, or may determine that the information is likely to be up to date before the data will be accessed.

In other examples, individual queries may be selected to use a protocol according to this Example 6. In a particular implementation, a query may be set, such as automatically by the database system, for example, based on settings made by a database administrator, or by a user, such that the query uses a protocol of this Example 6. In a specific example, the query may be set to use a protocol of this Example 6 if a delay in executing all or a portion of a query exceeds a predetermined threshold, or upon manual intervention of a user. In this way, a query may continue with possibly outdated data rather than delaying query execution for an undesirably long period of time.

Worker nodes 1012 and 1016 execute query $S_i$ in blocks 1030, 1034 respectively. Worker node 1016 sends execution results to worker node 1012 in communication 1038. Worker node 1012 returns execution results to a database client in process 1042.

The coordinator node 1008, worker node 1012, and worker node 1016 synchronize transaction identifiers, such as a timestamps, in process 1046. For example, synchronization may be carried out as described above in Example 5, including carrying out more than one synchronization operation in a synchronization cycle.

Although synchronization process 1046 is shown as being carried out after query results have been returned to the client in process 1042, process 1046 may occur at other times. For example, process 1046 could be carried out after worker node 1012 sends communication 1026 to worker node 1016 and before query results are returned to the client in process 1042, or the synchronization process 1046 could be carried out before worker node 1012 sends communication 1026 to worker node 1016. More generally, the synchronization in block 1046 happens periodically, regardless of whether a query has been received with one or more statements and one or more transactions to process. When a query is received, the worker nodes 1012, 1016 use the most recent synchronization information provided with periodic synchronization, without waiting for another round of synchronization to finish.

As described above, by allowing multi-node queries to be executed at remote worker nodes without waiting to synchronize transaction identifiers, it is possible that the query may access some data that is out of date. Periodic synchronization of the transaction identifiers of the worker nodes 1012, 1016, such as using the protocol of Example 5, reduces the chances of changes at a remote node not being visible to a query, particularly if the interval between synchronizations is relatively low, such as being on a comparable timescale as the rate that changes are made to remote nodes.

In at least certain implementations, a database session has access to all changes made during the session, regardless of the node to which the changes were made. In these implementations, the chance of a query accessing out of date information is further reduced, as changes made during the same session will be visible to the query. For example, a database session may include a session context that includes a transaction identifier representing the last (most recent) commit timestamp or snapshot timestamp assigned to any event of the session. So, when a new statement is started in the session, if the LCT of the node receiving the statement is smaller than the session context transaction identifier, the LCT of the node is set to the value of the session context transaction identifier. In this way, the snapshot timestamp assigned to the new statement will be at least as large as the session context transaction identifier, and thus prior events in the session will be visible to the new statement. If the LCT value of the node is equal to or greater than the session context transaction identifier, the session context transaction identifier is assigned the current LCT value of the node.

Similarly, when a write transaction commits at a node during a session, the write increments the LCT of the node and is assigned as the transaction commit ID. The session context transaction identifier is set to this updated value. As described above, any new statement will have a snapshot value at least as large as the incremented LCT value, and thus the committed transaction will be visible to later statements within the same session.

Figure 11:
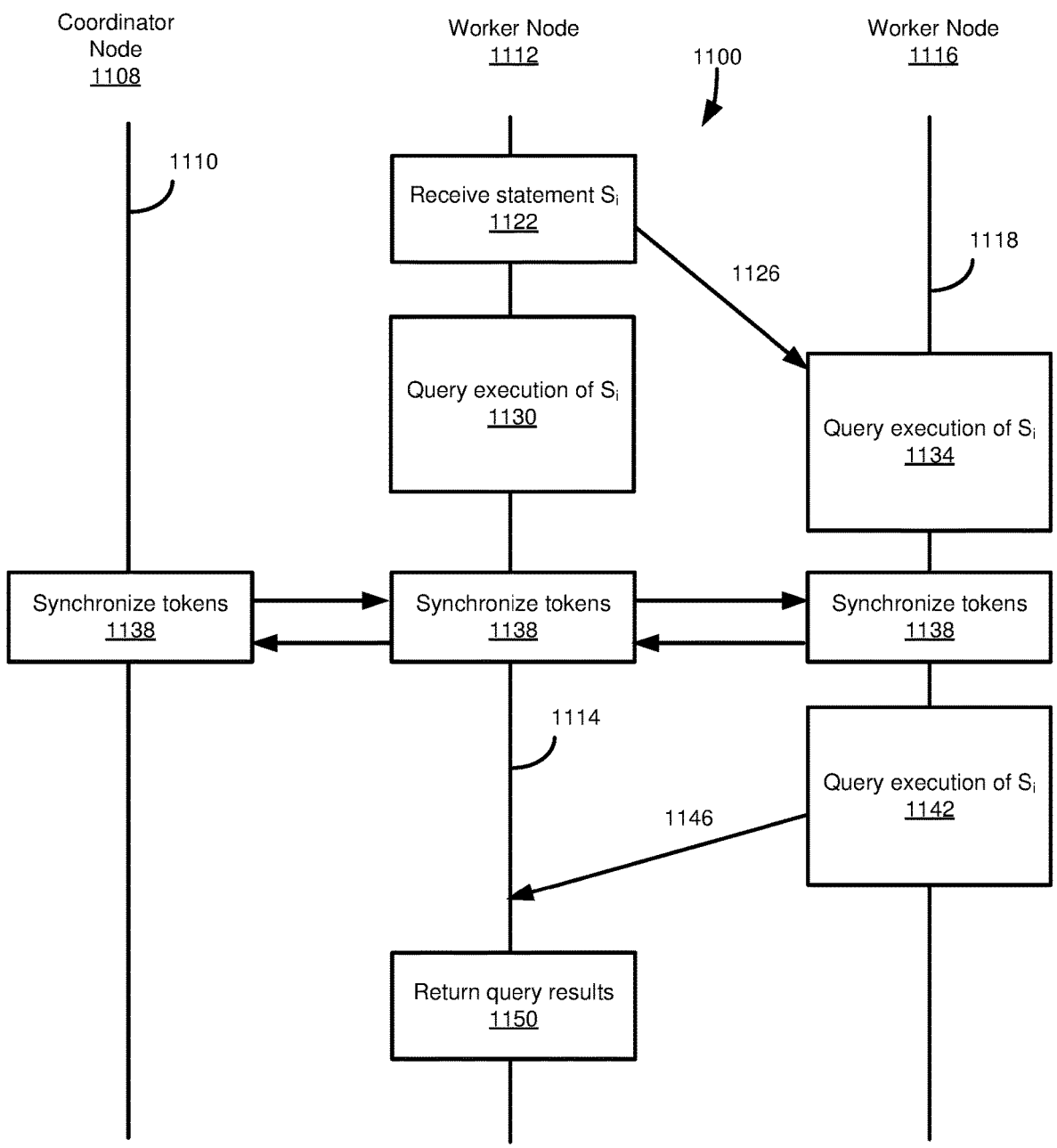
FIG. 11 is a diagram illustrating operations occurring at a coordinator node and first and second worker nodes during execution of a multi-node database statement with synchronization of transaction identifiers of the first and second worker nodes occurring during execution of the multi-node database statement.

FIG. 11 illustrates another scenario for a protocol according to this Example 6. In the scenario 1100, a system includes a coordinator node 1108, a worker node 1112, and a worker node 1116, with respective execution timelines 1110, 1114, 1118. In block 1122, worker node 1112 receives a multi-node statement $S_i$ that includes read operations, such as a database query. Without waiting to synchronize a transaction identifier, such as a local transaction identifier maintained by the first worker node, with the coordinator node 1108, the worker node 1112 sends the statement, or components of the statement executable at worker node 1116, to worker node 1116 in communication 1126. The worker nodes 1112, 1116 execute query $S_i$ in blocks 1130 and 1134, respectively.

In process 1138, the worker nodes 1112, 1116 synchronize their transaction identifiers with the coordinator node 1108, such as using the protocol of Example 5. Again, the synchronization can include more than one synchronization operation in a synchronization cycle. Although synchronization process 1136 is shown after query execution 1130, 1134, process 1138 may occur at other times. Generally, the synchronization in block 1338 happens periodically, regardless of whether a query has been received with one or more statements and one or more transactions to process. When a query is received, the worker nodes 1112, 1116 use the most recent synchronization information provided with periodic synchronization, without waiting for another round of synchronization to finish.

When worker node 1116 determines the appropriate transaction identifier, it can restart the query $S_i$ in block 1142, using the updated transaction identifier of the worker node 1116. For example, the worker node 1116 may determine if any records accessed by $S_i$ have a newer transaction identifier than the transaction identifier used at block 1134. If so, the statement $S_i$ may be restarted. That is, the statement can be restarted using the updated transaction identifier, rather than the original transaction identifier received from the worker node 1112. In this way, the chances of a query encountering inconsistent data are further reduced.

In other examples, with continued reference to FIG. 11, in block 1134, worker node 1116 executes the statement $S_i$ for records that have not been updated since the transaction identifier, such as a timestamp, assigned to $S_i$ by the worker node 1112. If records are identified having a later transaction identifier, processing of those records may be delayed until the synchronization process 1138 has been carried out, with the remainder of statement $S_i$ being carried out in block 1142. Waiting for an updated transaction identifier can help ensure that the statement sees the correct record versions.

Query results are returned to the worker node 1112 by the worker node 1116 in communication 1146. In block 1150, worker node 1112 returns query results to a database client.

Example 7—Selective Application of Delayed Snapshot Isolation

As described above, particular snapshot isolation protocols can create the possibility of a database operation, such as a query, accessing out of date records, as recently committed changes may not be visible to the query if the query snapshot timestamp is less than the timestamp of recently committed changes. This can occur even if the query started after the changes were committed. An example of such a snapshot isolation protocol is the "no wait" approach described in Example 6.

In some cases, different protocols, including snapshot isolation protocols, may be used for different requests for database operations. That is, a particular type of request, a request from a particular database client (or a request associated with a particular database session), or a particular request may be executed using a protocol that provides a lower level of transactional consistency, while other requests may be executed using a protocol that provides a higher level of transactional consistency.

For example, OLAP requests are typically used for analyzing large volumes of data. Accordingly, that an OLAP query does not see current versions of a limited number of records is not likely to significantly affect the results in many cases. On the other hand, at least certain types of OLTP queries may assume that data retrieved represents the current state of the database system. Thus, in some cases, different types of requests can be associated with a particular type of snapshot isolation protocol, such as using the protocol of Example 5 ("wait"), or other strongly-consistent protocol, for OLTP queries or other database operations associated with strong consistency, and using the protocol of Example 6 ("no wait") or other weaker-consistency protocol for OLAP queries or other database operations associated with weaker consistency. Optionally, the protocol associated with a particular type of request can be a default protocol, and another protocol can be used, such as if a database client or the request itself specifies that another protocol should be used.

In further aspects, particular database clients, or particular database sessions, can prefer that a high-consistency protocol be used, while other database clients or sessions may not require a high-consistency protocol, instead preferring to receive results more quickly, for example, even if the results may be somewhat out of date. As an example, some applications, even if issuing OLTP requests, may not require the absolute most-recent data be used. Thus, certain clients or sessions may be associated with a default protocol type (providing strong or weaker consistency). This default protocol can be changed, including for particular requests for database operations or particular sessions.

In some cases, when a session is established, a command can be issued to set which protocol should be used for a session, including changing from a default protocol. In some cases, the command can be issued directly by an end user (including a database administrator), while in other cases the command can be issued by a database client (e.g., an application). However, in some cases, a database client or user may lack the necessary privileges to alter session parameters.

Individual requests for database operations can specify consistency parameters to be applied to the request. For instance, at least certain database systems, including the HANA database system of SAP SE of Walldorf, Germany, provide commands in the structured query language (SQL) for providing "hints," execution parameters to be used in executing a request. For instance, hints may be used to determine where the request is routed, whether a new cache plan should be created instead of using an existing plan, engines used to execute the request, whether to use a row store or a column store, whether to used cached result data, and other execution parameters.

The disclosed innovations provide for specifying in a request that the request will accept a weaker level of consistency. In some cases, the request can simply specify the request will accept a weaker level of consistency, and the database system determines what protocol, such as a snapshot isolation protocol, to use. In other cases, the request can specify a particular level of inconsistency that is acceptable for the request. In either case, the database system can track when the snapshot identifier/commit identifier (or similar identifier) was last synchronized, including with a coordinator node or other source of a master or global snapshot or commit identifier.

If the request does not specify a particular level of consistency, in particular aspects, the database system can compare the difference between a current time (or timestamp value) and the time (or timestamp value) when a worker node was last synchronized with a coordinator node and process the request using a weaker-consistency protocol if the difference does not exceed a default threshold value. If the threshold value is exceeded, the database system can use a different snapshot isolation protocol for the request, including initiating a synchronization process or requesting a global snapshot identifier from a coordinator node. In other aspects, the request can supply the threshold value, which can be used instead of the default threshold value.

In one aspect, a request can specify that the request should be executed at a particular worker node and that a delayed snapshot isolation protocol can be used (e.g., one having potentially weaker consistency than a protocol where a global snapshot timestamp is always obtained from a coordinator node), but that the worker node should synchronize with the coordinator node if a level of delay is exceeded. Or, in other cases, instead of synchronizing with the coordinator node, the request can be routed to a different node, such as a node that has synchronized its timestamp more recently with a global value or to a coordinator node.

Figure 12:
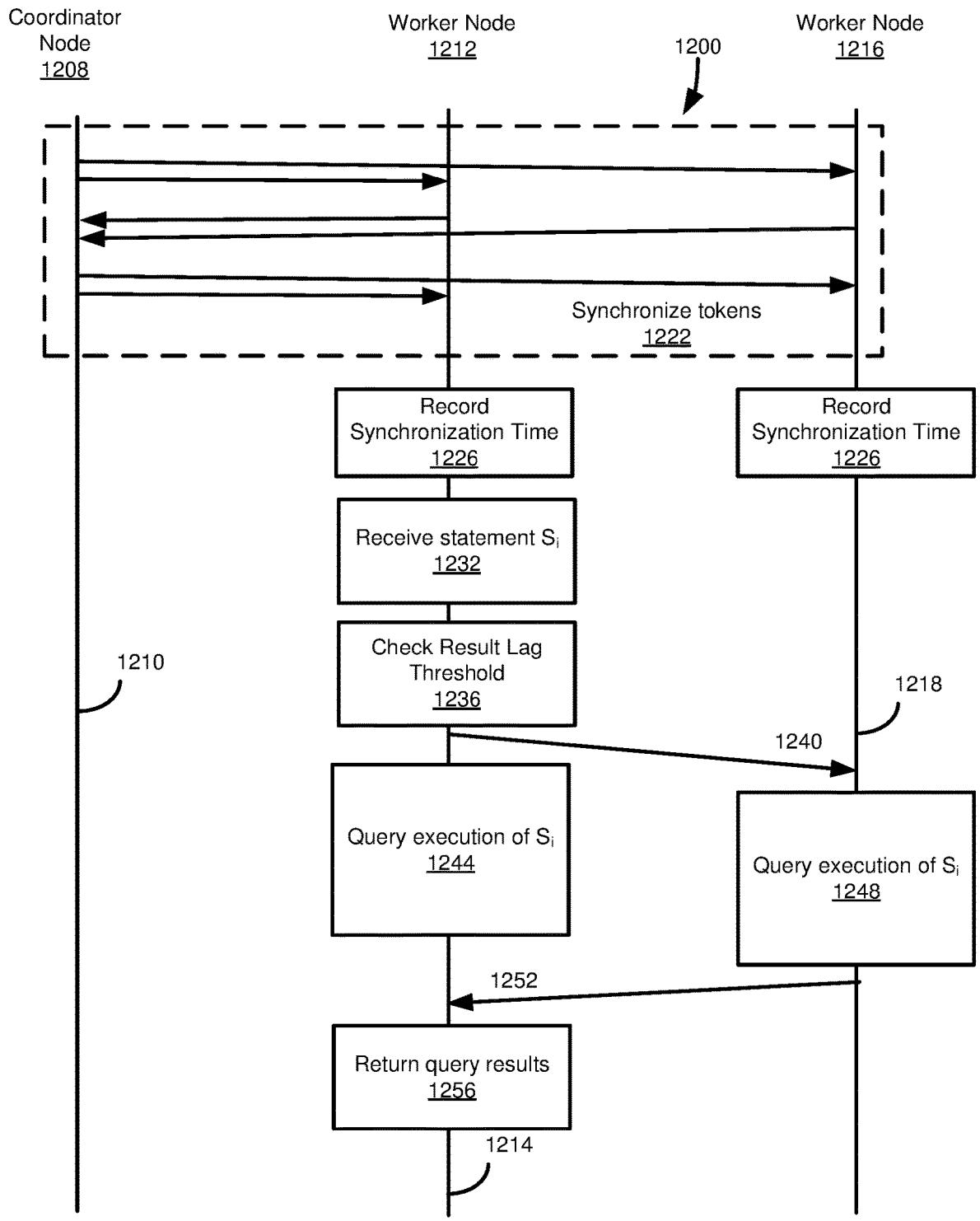
FIG. 12 is a diagram illustrating operations occurring at a coordinator node and first and second worker nodes according to a disclosed innovation where a result lag threshold of a request for a database operation is used to determine that the request can be executed using a current value of a local snapshot identifier.

FIG. 12 illustrates operations 1200 occurring at a coordinator node 1208, a worker node 1212, and a worker node 1216, having respective execution timelines 1210, 1214, 1218, according to a disclosed innovation where queries can be executed without an additional synchronization step if a more weakly-consistent snapshot isolation policy, such as delayed snapshot isolation, can be used and a result lag threshold is not specified or is not exceeded. The nodes 1208, 1212, 1216 synchronize snapshot isolation identifiers, such as commit timestamps, at 1222. In some cases, the synchronization at 1222 can be a synchronous process, as shown. For instance, synchronization may occur in a manner at least analogous to the operations 700 of FIG. 7.

In other cases, synchronization at 1222 can occur asynchronously, with the coordinator node 1208 synchronizing with the worker node 1212 at a different time than the coordinator node synchronizes with the worker node 1216. For example, the worker nodes 1212, 1216 can periodically update their snapshot timestamp values as part of processing a query for which a more strongly-consistent protocol has been specified, such as in the operations 500 of FIG. 5, or as part of a transaction commit protocol. In some cases, all of the nodes 1208, 1212, 1216 may at least periodically have the same snapshot identifier value. In other cases, at least one of the worker nodes 1212, 1218 may have a different (typically lower, but in some cases potentially higher) snapshot timestamp value than the coordinator node 1208 and optionally another worker node. However, the synchronization 1222 denotes that the differences in snapshot timestamp values is periodically reduced, if not completely synchronized.

At 1226, regardless of how synchronization at 1222 was carried out, a synchronization time is recorded by the worker nodes 1212, 1216. Although not shown, in at least some implementations, the synchronization time can also be recorded by the coordinator node 1208. At 1232, the worker node 1212 receives a statement (e.g., a SQL statement) $S_i$.

The statement $S_i$ is associated with a snapshot isolation protocol that can provide potentially weaker consistency, such as delayed snapshot isolation. The statement $S_i$ can specify a maximum level of acceptable inconsistency, such as maximum time between when the snapshot isolation identifier of the worker node 1212 was last synchronized with the coordinator node 1208. In a particular example, the maximum time can be specified in a query language, such as a query "hint." Or, the statement $S_i$ does not specify such a maximum time, but the worker node 1212 includes such a maximum time as a default value (which, in some cases, can be different for different types of statements, or statements from different types of database clients).

The difference between a current time and the last synchronization time is determined. The difference is compared with the maximum time specified in the statement $S_i$ or the default value. The difference is determined to be less than the maximum time (or less than or equal to the maximum time). At least a portion of the statement $S_i$ is sent from the worker node 1212 to the worker node 1216 in communication 1240. The worker nodes 1212, 1216 execute the statement (e.g., executing a query) at 1244 and 1248, respectively. The worker node 1216 returns execution results to worker node 1212 in communication 1252. Execution results are sent from the worker node 1212 to a database client at 1256.

Various changes may be made to the operations 1200. In particular, at 1236, the statement $S_i$ may not be associated with a specified result lag value or a default result lag value. In which case, the statement $S_i$ is sent to the second worker node 1216 at 1240, and executed at 1244, 1248, without carrying out the check at 1236. A database system may receive requests associated with different snapshot isolation protocols, such as requests associated with two or more of a strongly-consistent protocol (e.g., using the operations 500 of FIG. 5), a weakly-consistent protocol where a request specifies a result lag, a weakly consistent protocol where a default result lag value is applied, and a weakly consistent protocol that is applied without reference to a result lag value.

Figure 13:
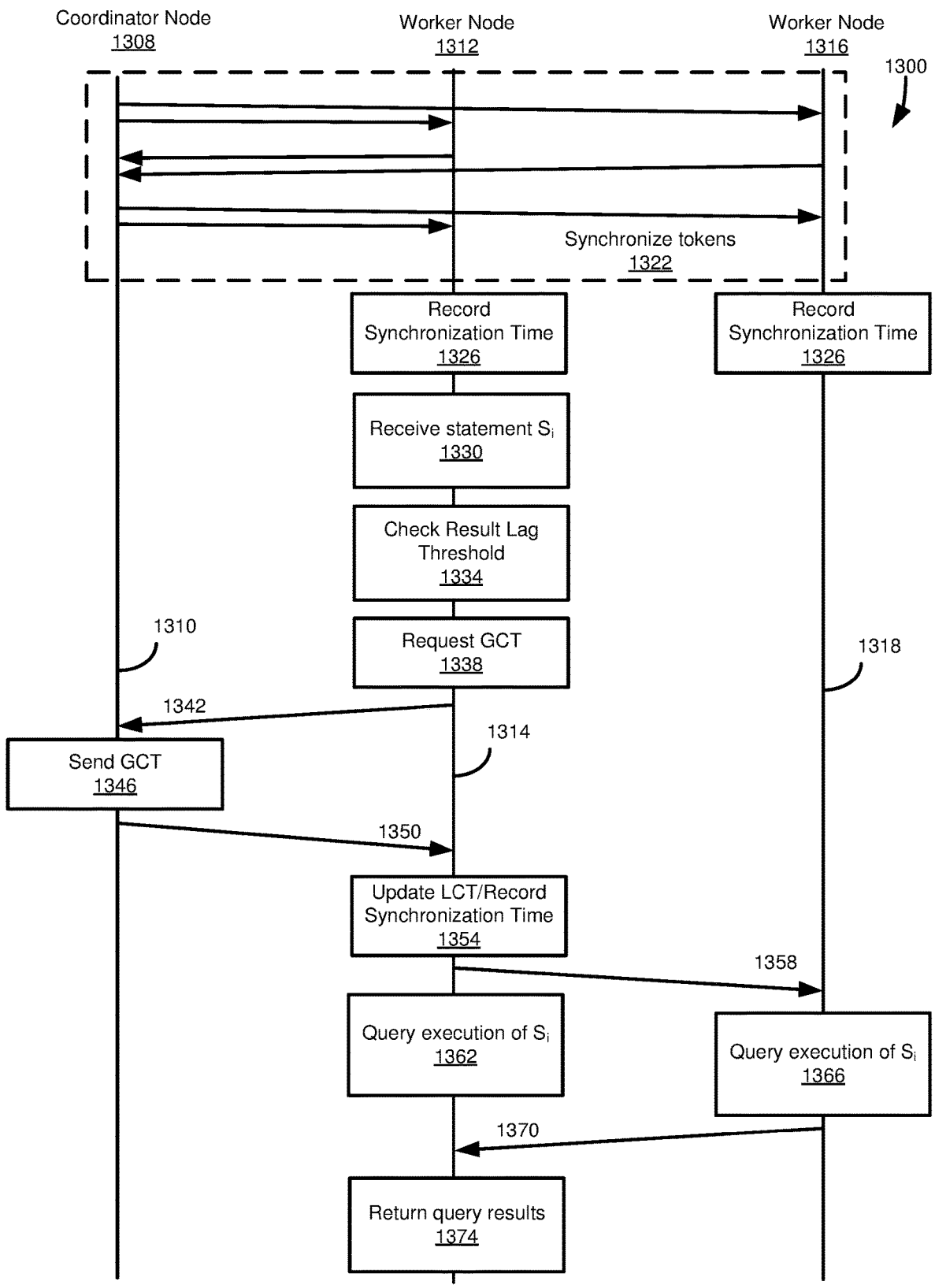
FIG. 13 is a diagram illustrating operations occurring at a coordinator node and first and second worker nodes according to a disclosed innovation where a result lag threshold of a request for a database operation is used to determine that the request should be executed after obtaining a global snapshot identifier value from the coordinator node.

FIG. 13 illustrates operations 1300 that initially are analogous to the operations 1200, but illustrate how an innovative snapshot isolation protocol of the present disclosure can proceed when it is determined that a result lag threshold (either a threshold specified in a request or a default value) has been exceeded, or otherwise not satisfied. The operations are carried out at a coordinator node 1308, a worker node 1312, and a worker node 1316, with respective execution timelines 1310, 1314, 1318.

At 1322, the nodes 1308, 1312, 1316 synchronize snapshot isolation identifiers, such as commit timestamps. The synchronization 1322 can be analogous to the synchronization 1222, including having a synchronous synchronization process between the nodes 1308, 1312, 1316 or having the coordinator node 1308 separately communicate with each worker node 1312, 1316 to update the snapshot isolation identifiers of the worker nodes. Irrespective of how synchronization 1322 is carried out, the worker nodes 1312, 1316 record the synchronization time at 1326. Optionally, the coordinator node 1308 can also record the synchronization time.

At 1332, the worker node 1312 receives a statement (e.g., a SQL statement) $S_i$. The statement $S_i$ is associated with a snapshot isolation protocol that can provide potentially weaker consistency, such as delayed snapshot isolation. The statement $S_i$ can specify a maximum level of acceptable inconsistency, such as maximum time between when the snapshot isolation identifier of the worker node 1312 was last synchronized with the coordinator node 1308. In a particular example, the maximum time can be specified in a query language, such as a query "hint." Or, the statement $S_i$ does not specify such a maximum time, but the worker node 1312 includes such a maximum time as a default value (which, in some cases, can be different for different types of statement, or statements from different types of database clients).

The difference between a current time and the last synchronization time is determined. The difference is compared with the maximum time specified in the statement $S_i$ or the default value. The difference is determined to be greater than the maximum time (or greater than or equal to the maximum time), indicating that the level of possible inconsistency from proceeding using the current snapshot isolation identifier value of the worker node 1312 is unacceptably high. Accordingly, at 1338, the worker node 1312 requests the value of a current global snapshot identifier from the coordinator node 1308 in communication 1342. The coordinator node 1308, at 1346, sends the current value of the global snapshot identifier (such as a global commit timestamp) to the worker node 1312 in communication 1350 with the assigned snapshot timestamp value. In another aspect, rather than requesting the snapshot timestamp value of the coordinator node 1308, the worker node 1312 can request the snapshot identifier value of the worker node 1316 (e.g., as described with respect to FIG. 9).

The worker node 1312, at 1354, after receiving the communication 1350, updates its local snapshot identifier (e.g., local commit timestamp) to have the value of the global snapshot identifier specified in the communication. The worker node 1312 sends at least a portion of the statement $S_i$ to the worker node 1316 for execution in communication 1358. The worker nodes 1312, 1316 execute the statement, such as executing a query, at 1362, 1366, respectively. The worker node 1316 sends execution results to the worker node 1312 in communication 1370. At 1374, the worker node 1312 sends execution results to the database client which sent the statement $S_i$.

Figure 14:
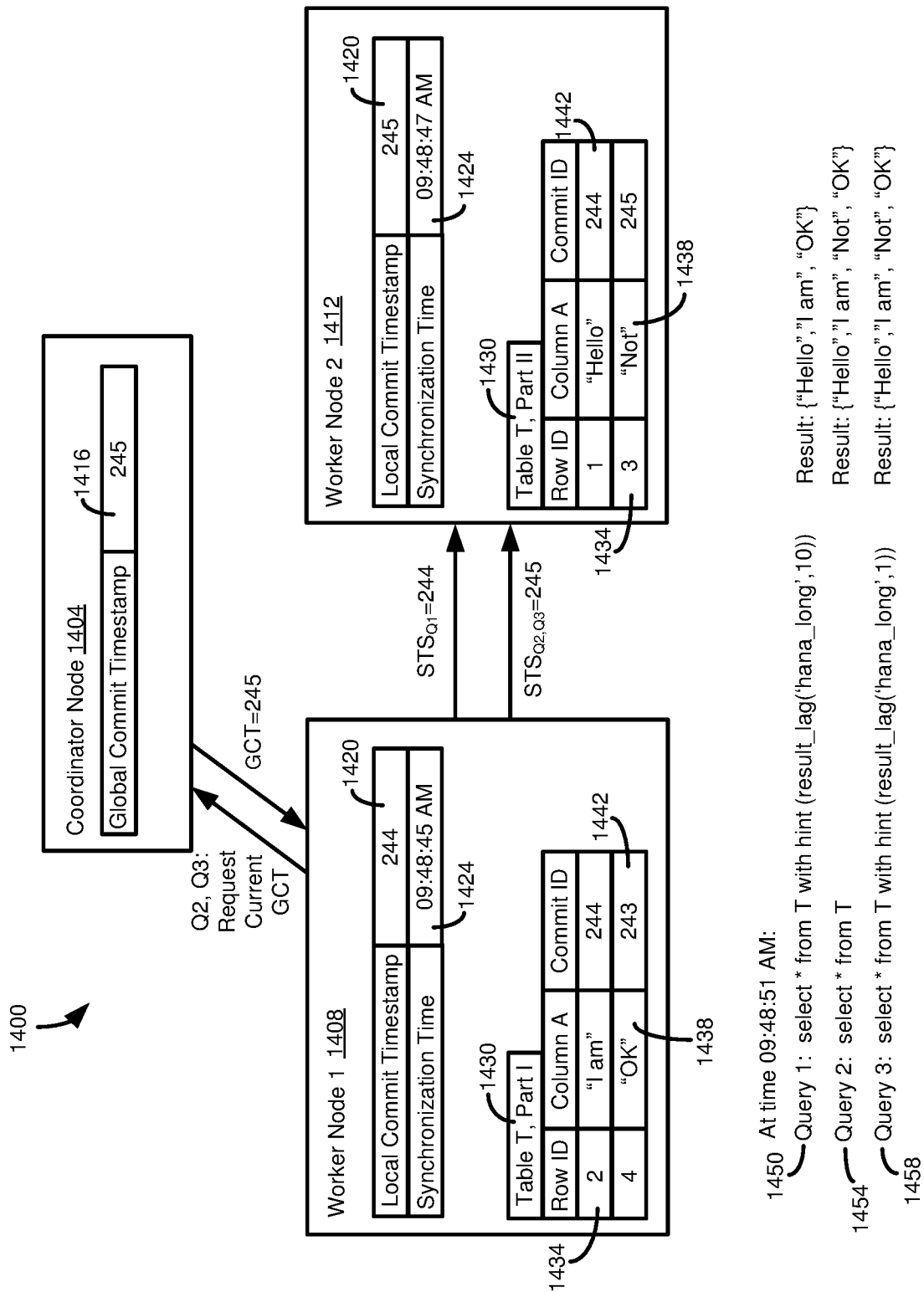
FIG. 14 is a diagram illustrating a distributed database environment having a coordinator node and first and second worker nodes and how selection of a snapshot isolation protocol can affect query results.

FIG. 14 presents an example database environment 1400 illustrating potential consequences of a using a snapshot isolation policy that is weakly-consistent. The database environment 1400 includes a coordinator node 1404, a first worker node 1408, and a second worker node 1412. The coordinator node 1404 maintains a global synchronization identifier 1416, such as a global commit timestamp. The global commit timestamp has a current value of 245.

Each worker node 1408, 1412 includes a local synchronization identifier 1420, such as a local commit timestamp (which can be a local snapshot identifier). Each worker node 1408, 1412 also include a last synchronization time 1424, representing the last time the worker node synchronized its local synchronization identifier 1420 with the global synchronization identifier 1416. In some cases, the local synchronization identifiers 1420 of the worker nodes 1408, 1412 can be the same. In other cases, the local synchronization identifiers 1420 of the worker nodes 1408, 1412 can be different. Similarly, in some cases (such as when a synchronization event has recently occurred), the local synchronization identifiers 1420 of one or both of the worker nodes 1408, 1412 can have the same value as the global synchronization identifier 1416, while in other cases one or both of the local synchronization identifiers can have a different value than the value of the global synchronization identifier.

As shown, the second worker node 1412 synchronized more recently (09:48:47 AM) with the coordinator node 1404 than the first worker node 1408 (09:48:45, two seconds earlier than the second worker node). Accordingly, the local synchronization identifier 1420 of the second worker node 1412 has a value of 245, which is the same as the current value of the global synchronization identifier 1420, but is greater than the value of the local synchronization identifier of the first worker node 1408, which has a value of 244.

The worker nodes 1408, 1412 each maintain a portion 1430 of a distributed, or partitioned, table T. Each portion 1430 of table T includes a row identifier 1434, a column 'A' 1438, and commit identifiers 1442, indicating when the data of the corresponding row identifier was last changed (e.g., added, modified, or deleted). The first worker node 1408 hosts rows having identifiers 2 and 4, while the second worker node 1412 hosts rows having identifiers 1 and 3.

FIG. 14 further illustrates a first query 1450, a second query 1454, and a third query 1458, each received at 09:48:51 AM, and each to be received and executed (at least primarily) by the first worker node 1408. The queries 1450, 1454, 1458 are identical, selecting all data from table T, except that the first and third queries 1450, 1458 include a result lag hint ("with hint (resul_lag('hana_long',10)), ("with hint (result_lag('hana_long',1))). Thus, the first and third queries 1450, 1458 indicate that they can, at least potentially, be processed using a weakly-consistent snapshot isolation protocol, such as delayed snapshot isolation. The second query 1454 does not provide an indication that weaker-consistency is acceptable, and so is processed using a more strongly-consistent snapshot isolation protocol (e.g., one where a current snapshot timestamp value is obtained from the coordinator node 1404 before the query is executed).

Taking first the execution of the first query 1450, the query hint indicates that the query can be processed using a more weakly-consistent snapshot isolation protocol (such as one that does not obtain a current global snapshot identifier value before executing) so long as the synchronization time 1424 of the first worker node 1408 is not more than 10 seconds older than time the query was requested. In this case, the difference between the synchronization time 1424 of the first worker node 1408 and the time the first query 1450 was requested is 6 seconds. Since 6 seconds is less than the 10 second threshold provided in the result lag hint for the first query 1450, the first query can be processed using a more weakly-consistent snapshot isolation protocol, such as executing using the current local snapshot timestamp 1420 (244) of the first worker node 1408 rather than retrieving the current global timestamp value 1416 (245) from the coordinator node 1404.

The first query 1450 is executed at the first worker node 1408, which identifies both rows 2 and 4 as having responsive data, as the commit timestamps for those rows (244, 243) are less than or equal to the snapshot timestamp value used for the query (244, the current snapshot timestamp identifier value 1420 of the first worker node 1408). As the second worker node 1412 also includes part of table T, the first worker node 1408 sends the first query 1450 to the second worker node to be executed, including its assigned snapshot timestamp of 244. Worker node 1412 identifies that only row 1 is responsive to the first query 1450, as its commit timestamp is equal to the snapshot timestamp for the query. Row 3 is determined not to be responsive, as the commit timestamp of 245 is larger than the snapshot timestamp of 244. The second worker node 1412 returns execution results (row 1) to the first worker node 1408. The first worker node 1408 returns the execution results of the first query 1450, the values for rows 1, 2, and 4 or {"Hello", "I am", "OK"}.

Taking next the second query 1454, as it does not indicate that a more weakly-consistent snapshot isolation protocol is acceptable, before executing the query, the first worker node 1408 requests the current global snapshot identifier value from the coordinator node 1404. The coordinator node 1404 sends the current global snapshot identifier value of 245. The first worker node 1408 receives the current global snapshot identifier, updates its local snapshot timestamp identifier 1424 to 245, and updates the synchronization time 1424 (to 09:48:51 AM, or a time thereafter).

The updated local snapshot identifier value of 245 is assigned to the second query 1454 as its snapshot timestamp. The second query 1454 is executed at the first worker node 1408, which identifies that both rows 2 and 4 are responsive to the query, as their commit identifiers 1442 are less than or equal to 245, the snapshot timestamp of the second query. As a portion of table T is maintained at the second worker node 1412, the first worker node 1408 forwards the second query 1454 to the second worker node for execution. The second worker node 1412 identifies that both rows 1 and 3 are responsive to the query, as the values of the commit identifiers 1442, 244, 245, are both less than or equal to the snapshot timestamp value 245, of the second query 1454. The second worker node 1412 returns its query execution results, the values of rows 1 and 3, to the first worker node 1408. The first worker node 1408 returns the results of the second query 1454, the values of rows 1-4, or {"Hello", "I am", "Not", "OK"}.

Accordingly, the first and second queries 1450, 1454 can produce different results due to the different snapshot isolation protocols used. In some cases, such as for transactional processing that assumes up to date information, the difference may be significant. In other cases, such as for data mining or analytics, the difference may not be significant. Although the second query 1454 returns more accurate data, its execution is delayed given that it involves a roundtrip communication between the first worker node 1408 and the coordinator node 1404 to update the local snapshot identifier 1420 of the first worker node, a communication that is not required for the execution of the first query 1450.

Turning to the third query 1458, like the first query 1450, the third query indicates that a more-weakly consistent snapshot isolation protocol can be used under certain circumstances. In particular, the third query 1458 can be executed without obtaining a current global snapshot identifier value 1416 from the coordinator node 1404 so long as the synchronization time 1424 of the first worker node 1408 is not more than 1 second older than time the query was requested. In this case, the difference between the synchronization time 1424 of the first worker node 1408 and the time the third query 1458 was requested is 6 seconds. Since 6 seconds is greater than the 1 second threshold provided in the result lag hint for the third query 1458, the third query cannot be processed using a more weakly-consistent snapshot isolation protocol. Instead, the third query 1458 is processed after updating the local snapshot timestamp 1420 of the first worker node 1408 based on the current value of the global snapshot identifier retrieved from the coordinator node 1404, 245, providing the same query execution results as the second query 1454.

FIG. 14 demonstrates that individual requests for database operations, or request associated with a particular database client or database session, can select whether, or under what circumstances, execution can proceed with a potentially out of date snapshot timestamp, which can avoid a roundtrip communication with the coordinator node to obtain a current value of a global snapshot identifier, but can possibly return out of date results. If out of date results are unacceptable, a query can, for example, omit a result lag hint. If out of date results are unacceptable beyond a certain time limit, that time limit can be specified in the request, and different values can be used for different requests (or different database clients or sessions). Although not shown, in some cases, a request can specify that out of date results are acceptable, but does not specify a particular time limit. In some cases, such requests can be processed without updating a snapshot identifier value of the worker node, while in other cases a default threshold delay value can be applied (in a manner otherwise analogous to when a value is specified in a request).

Figure 15:
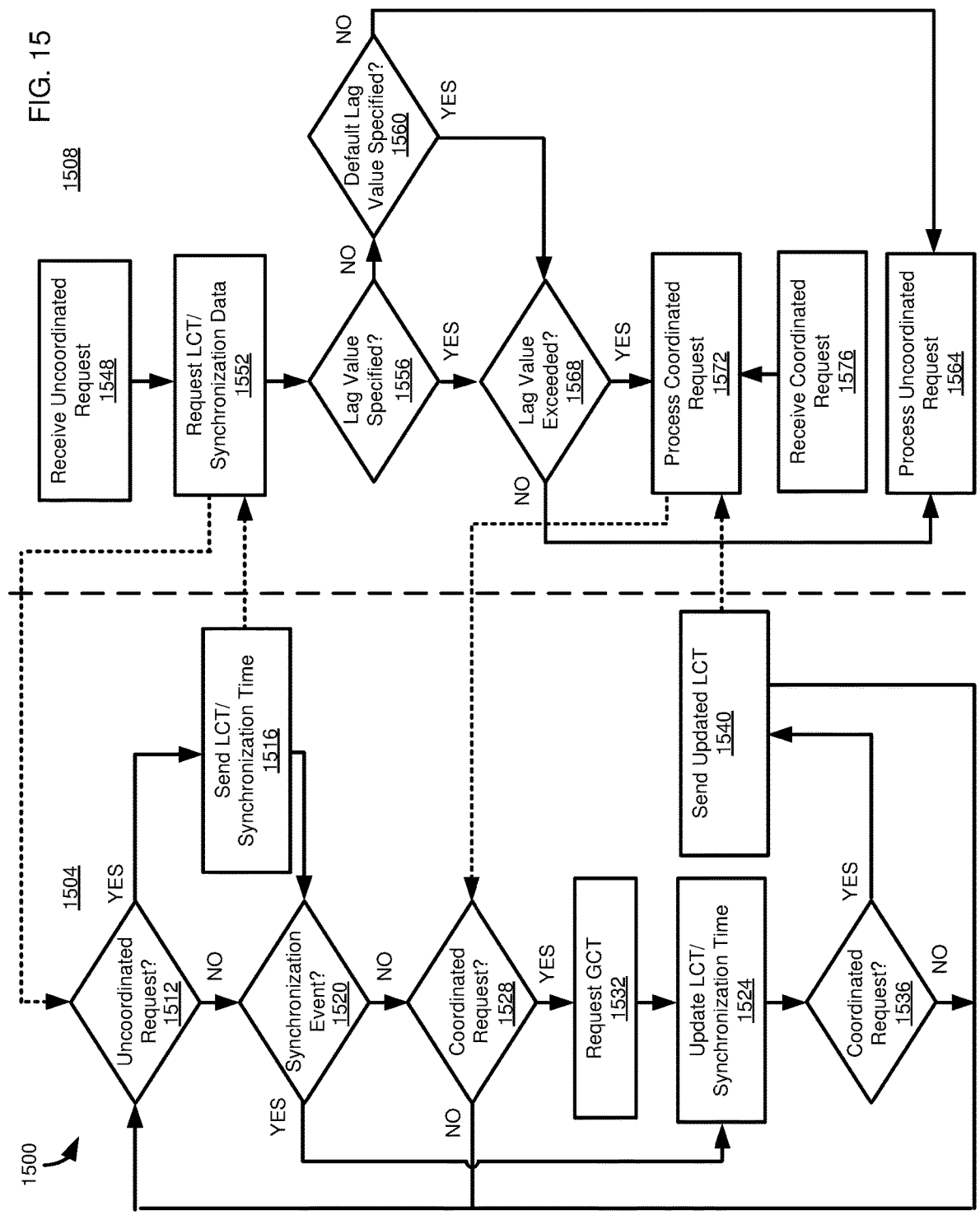
FIG. 15 is a flowchart of operations occurring at a worker node in a disclosed innovation relating to selecting a snapshot isolation protocol based whether a request for a database operation includes a result lag hint.

Example 8—Example Worker Node Operations During Selective Determination of Snapshot Isolation Protocol FIG. 15 illustrates operations 1500 occurring in at least certain embodiments of the disclosed innovations. The operations 1500 can occur in a worker node, including at a snapshot identifier component 1504 and a request execution component 1508. The snapshot identifier component 1504 can be, for example, a component that tracks a current, local value of a snapshot timestamp identifier (such as a local commit timestamp) and can synchronize with a global snapshot identifier (e.g., maintained by a coordinator node), or another snapshot identifier (such as the local snapshot identifier of another worker node), either at defined intervals, when requested by a coordinator node or another worker node, or as initiated by the worker node. The request execution component 1508 can be responsible for determining what snapshot isolation protocol should be applied to a request for a database operation, assigning a snapshot timestamp to the request, and executing the request (or causing the request to be executed).

As described above, the snapshot timestamp component can carry out operations to synchronize a local snapshot identifier with a global snapshot identifier and to provide snapshot identifier information to the request execution component 1508. At 1512, the snapshot identifier component 1504 determines whether an uncoordinated request for a database operation has been received (e.g., a request where a more weakly-consistent snapshot timestamp protocol, including delayed snapshot isolation, where a request can be executed without obtaining a current global snapshot identifier value). If such a request has been received, the current local commit timestamp, and time of last synchronization with the global snapshot identifier, are sent to the request execution component 1508 at 1516.

After 1516, or if an uncoordinated request was not received, the snapshot identifier component 1504 can determine at 1520 whether a synchronization event has occurred. A synchronization event can include receiving an updated snapshot identifier (which can also be a commit identifier) from a coordinator node. If a synchronization event has occurred, at 1524 the snapshot identifier component 1504 updates the local snapshot timestamp/local commit timestamp of the worker node, and records a time that the synchronization occurred.

If, at 1520, a synchronization did not occur, the snapshot identifier component 1504 can determine, at 1528, whether a coordinated request for a database operation was received. A coordinated request for a database operation can be a request where a more strongly-consistent snapshot isolation protocol is to be used, including for requests where conditions for using a more weakly-consistent snapshot isolation policy were not met. A coordinated request can be a request where a global snapshot identifier value is to be retrieved before the request is executed. If, at 1528, it is determined that a coordinated request was not received, the operations 1500 can return to 1512 to wait for an uncoordinated event, a synchronization event, or a coordinated request to be received.

If it is determined at 1528 that a coordinated request has been received, the snapshot identifier component 1504 can request a current global snapshot identifier value from a coordinator node at 1532. The snapshot identifier component 1504 can update the local snapshot identifier value, and synchronization time, at 1524. At 1536, the snapshot identifier component 1504 determines whether a coordinated request was received. If a coordinated request was not received, the operations can return to 1512. If a coordinated request was received, the snapshot identifier component 1504 can send the updated snapshot identifier value to the request execution component 1508 at 1540, and then return to 1512.

Turning to the request execution component 1508, at 1548, an uncoordinated request for a database operation is received. A current local snapshot identifier and last synchronization time can be requested from the snapshot identifier component 1504 at 1552. After receiving the current local snapshot identifier value and last synchronization time, the request execution component 1508 can determine at 1556 whether the request specifies a lag value, an indication of how far out of date results can potentially be and still be acceptable for the request. If a lag value is not specified in the request, at 1560 it is determined whether a default lag value is specified. If a default lag value is not specified, the uncoordinated request can be processed at 1564, including using the current local snapshot identifier value of the worker node.

If it is determined at 1556 that the uncoordinated request specifies a lag value, or if a default lag value was determined at 1560 to be specified, the request execution component 1508 determines at 1568 whether the lag value (request-specified or default value) has been exceeded (such as if a difference between a current time and a last synchronization time exceeds a request-specified or default lag value). If it is determined at 1568 that the lag value has not been exceeded, the uncoordinated request can be processed (e.g., executed) at 1564 using the current local snapshot identifier value. If is determined at 1568 that the lag value has been exceeded, the uncoordinated request can be processed (e.g., executed) as a coordinated request at 1572. For instance, the request execution component 1508 can request a current global snapshot identifier value from the snapshot identifier component 1504 (which in turn obtains the value from the coordinator node). At 1576, the request execution component 1508 receives a coordinated request for a database operation. The coordinated request is processed at 1572.

Figure 16C:
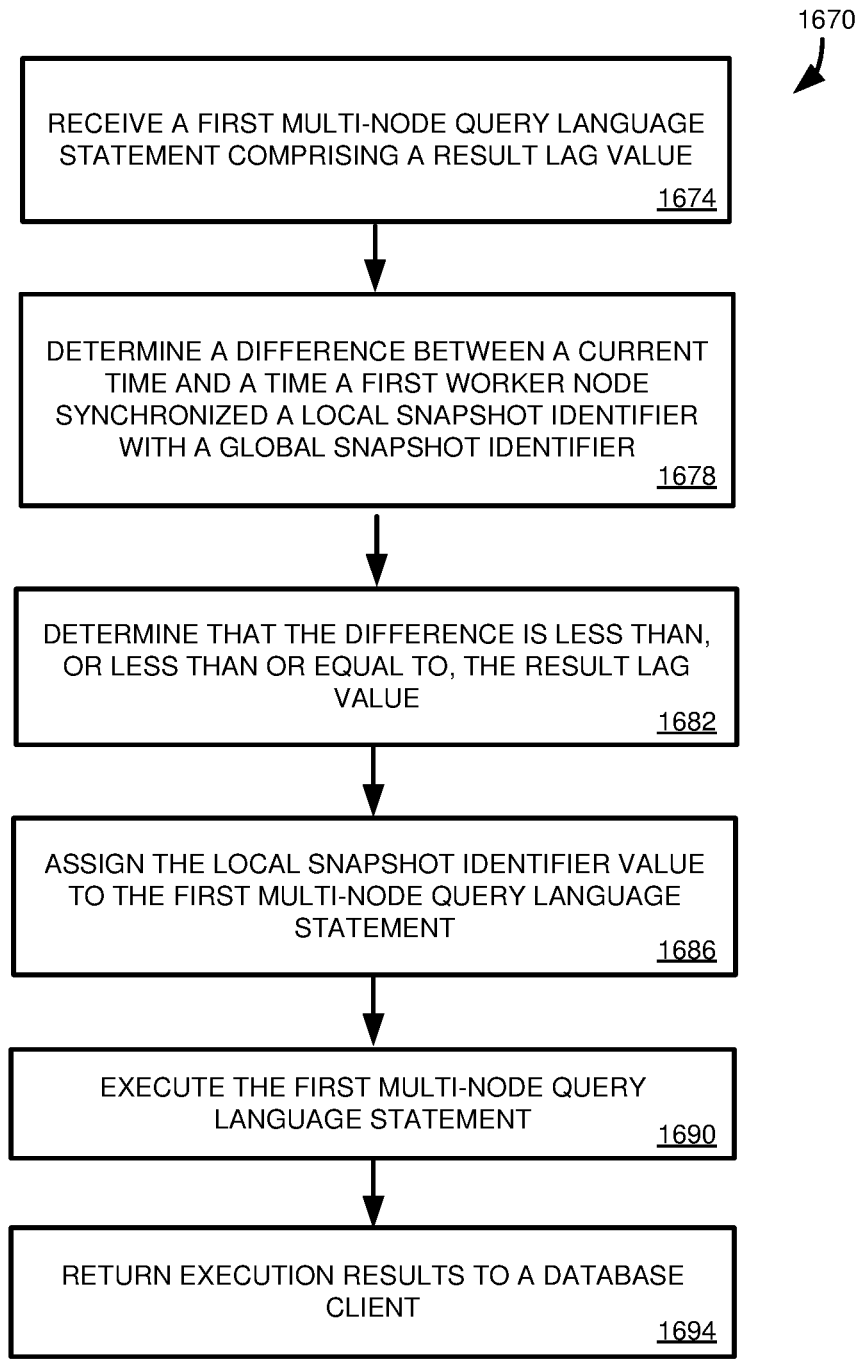

Example 9—Example Implementations of Selective Determination of Snapshot Isolation Protocol FIGS. 16A-16C illustrate operations 1600, 1630, 1670 occurring at a worker, or slave, database node according to various embodiments of the disclosed innovations. The worker node can be part of a distributed database environment, such as the database environment of FIG. 1, and may be implemented using a computing system, such as the computing system 1700 of FIG. 17.

With reference first to FIG. 16A, according to the operations 1600, a first request for a database operation is received at 1604. At 1608, criteria are determined for executing the first request using a current local snapshot identifier value. For instance, if the criteria are met (or satisfied), the first request may be executed without updating the local snapshot identifier value with a global value maintained by a coordinator node. In some cases, the criteria can be specified in the request, such as a maximum lag between a current time and a time the worker node last synchronized its snapshot identifier with a global snapshot identifier maintained by the master node. In other cases, the criteria can be specified in another manner, such as being specified for a particular database client, a particular session, or particular type of request (e.g., a type of database operation to be executed as part of the request).

At 1612, it is determined that the criteria are met, or are satisfied. For instance, when the criteria is a maximum lag, determining that the criteria are met can include determining that a difference between a current time and a time the worker node last synchronized its snapshot identifier with a global snapshot identifier of the coordinator node is less than, or less than or equal to, the threshold value. In other aspects, the criteria are specified in another manner and the determining can be carried out in another manner. The first request is executed using the current local snapshot identifier value (of the worker node) at 1616. Execution results are returned to the database client at 1620.

According to the operations 1630 of FIG. 16B, a worker node receives a request for a database operation at 1634. The request include semantic information for determining a snapshot isolation protocol to be applied in executing the request. In a specific example, the semantic information includes a hint in a query language that a more weakly-consistent snapshot isolation protocol can be used, or used under particular circumstances (e.g., if a time the worker node synchronized a local snapshot identifier with a global snapshot identifier satisfies a threshold, such as a threshold provided in the semantic information).

The worker node periodically synchronizes a local snapshot identifier with a global snapshot identifier at 1638. A time of the synchronizing is recorded at 1642. At 1646, the semantic information is compared with the synchronization time. A snapshot isolation protocol to be used with the request is determined at 1650. For instance, if the synchronization time satisfies the threshold, it can be determined that a current local snapshot identifier value should be used with the request. If the threshold is not satisfied, the worker node can synchronize its snapshot identifier with the global snapshot identifier, and the synchronized value used with the request. A snapshot timestamp value is assigned to the request at 1654, according to the protocol determined at 1650. The request is executed at 1660 and execution results are returned to the database client at 1664.

With reference to FIG. 16C, according to the operations 1670, a first multi-node query language statement is received at 1674. The first multi-node query language statement includes a result lag value. A difference is determined, at 1678, between a current time and a time the first worker node synchronized a local snapshot identifier with a global snapshot identifier. At 1682, it is determined that the difference is less than, or less than or equal to, the result lag time value. The local snapshot identifier value is assigned to the first multi-node query language statement at 1686. At 1690, the first multi-node query language statement is executed. Execution results are returned to a database client at 1694.

Example 10—Computing Systems

Figure 17:
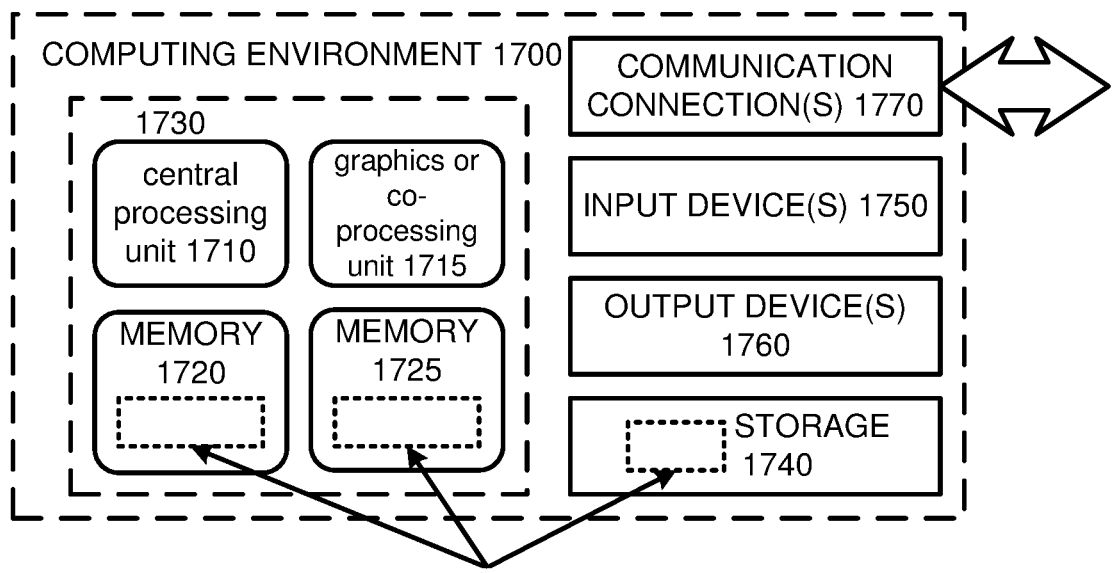
FIG. 17 is a diagram of an example computing system in which some described embodiments can be implemented.

FIG. 17 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), nonvolatile memory (e.g., ROM, EEPROM, flash memory, etc.), or some combination of the two, accessible by the processing unit(s) 1710, 1715. The memory 1720, 1725 stores software 1780 implementing one or more innovations described herein, in the form of computer-executable instructions suitable for execution by the processing unit(s) 1710, 1715.

A computing system 1700 may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 18:
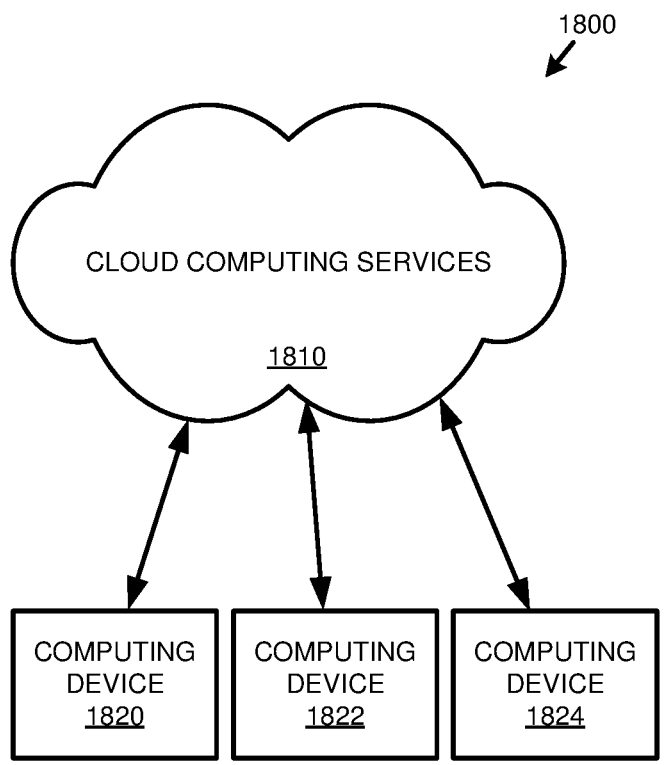
FIG. 18 is an example cloud computing environment that can be used in conjunction with the technologies described herein.

FIG. 18 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable media are any available tangible media that can be accessed within a computing environment (e.g., one or more optical media discs such as DVD or CD, volatile memory components (such as DRAM or SRAM), or non-volatile memory components (such as flash memory or hard drives)). By way of example and with reference to FIG. 17, computer-readable media include memory 1720 and 1725, and storage 1740. The term computer-readable media does not include signals and carrier waves. In addition, the term computer-readable media does not include communication connections (e.g., 1770).

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a first worker node comprising a processing unit and memory, the first worker node being in communication with a coordinator node and at least a second worker node, for facilitating executing requests for database operations within a distributed database environment, the method comprising:
   receiving a first request for a database operation to read or write data to a database implemented in the distributed database environment;
   determining criteria specified in the first request for initiating execution of the first request at the first worker node using a current local snapshot identifier value of the first worker node, if the criteria are not met the first worker node requests a global snapshot identifier value from the coordinator node before the initiating execution of the first request, and wherein a snapshot identifier value determines a state of the database used in executing the first request for a database operation, and the database state determines a particular set of values that are available for reading or updating during execution of the first request;
   determining that the criteria are met;
   in response to determining that the criteria are met, initiating execution of the first request at the first worker node using the current local snapshot identifier value; and
   returning execution results for the first request to a database client.

2. The method of claim 1, the method further comprising:
   receiving a second request for a database operation;
   determining criteria for executing the second request using a current local snapshot identifier value of the first worker node;
   determining that the criteria are not met;
   requesting a current global snapshot identifier value from the coordinator node;
   receiving the current global snapshot identifier value from the coordinator node;
   assigning the global snapshot identifier value as an updated current local snapshot identifier value; and
   executing the second request using the updated current local snapshot identifier value.

3. The method of claim 2, wherein the criteria for executing the first request comprises a threshold lag value and determining that the criteria are met comprises:

determining a time the current local snapshot identifier value was synchronized with the coordinator node;

determining a difference between a current time and the time the current local snapshot identifier value was synchronized with the coordinator node; and determining that the difference does not satisfy the threshold lag value.

4. The method of claim 2, the method further comprising:
recording a time associated with assigning the global snapshot identifier value as an updated current local snapshot identifier value.

5. The method of claim 1, wherein the criteria for executing the first request comprises a result lag value specified in the first request.

6. The method of claim 5, wherein the result lag value is specified in a query language.

7. The method of claim 1, wherein the criteria for executing the first request comprises a result lag value specified as a number of seconds.

8. The method of claim 1, wherein the criteria for executing the second request comprises a default lag value.

9. The method of claim 1, wherein the criteria for executing the first request comprises a threshold lag value and determining that the criteria are met comprises:

determining a time the current local snapshot identifier value was synchronized with the coordinator node;

determining a difference between a current time and the time the current local snapshot identifier value was synchronized with the coordinator node; and determining that the difference satisfies the threshold lag value.

10. The method of claim 1, the method comprising:
synchronizing the local snapshot identifier with a global snapshot identifier; and
recording a time associated with the synchronization.

11. The method of claim 10, wherein the synchronizing comprises:
receiving a second request for a database operation;
requesting a current value of a global snapshot identifier from the coordinator node;
receiving the current value of the global snapshot identifier from the coordinator node;
assigning the current value of the global snapshot identifier as an updated current value of the local snapshot identifier;
recording a time associated with the assigning;
executing the second request; and
returning execution result for the second request to the database client.

12. The method of claim 10, wherein the synchronizing comprises:
receiving a request from a database node for the current local snapshot identifier value;
sending the current local snapshot identifier value to the database node;
receiving a snapshot identifier value from the database node;
assigning the snapshot identifier value as an updated current value of the local snapshot identifier; and
recording a time associated with the assigning.

13. The method of claim 1, the method further comprising:
sending the current local snapshot identifier value and at least a portion of the request to the second worker node for execution; and
receiving execution results from the second worker node.

14. A server comprising a processing unit and memory, wherein the server is configured to operate a first worker node of a database system, the first worker node being in communication with a coordinator node, and the database system further including at least a second worker node, wherein the server is further configured to perform database transaction processing comprising:

receiving a request for a database operation to read or write data to the database system, the request comprising semantic information for determining a snapshot isolation protocol of a plurality of available snapshot isolation protocols to be applied to the request, wherein snapshot isolation protocols of the plurality of available snapshot isolation protocols are different than one another;

synchronizing a local snapshot identifier with a global snapshot identifier maintained by the coordinator node;

recording a time of the synchronizing;

comparing the semantic information with the synchronization time;

based at least in part on the comparing, determining a selected snapshot isolation protocol of the plurality of snapshot isolation protocols to be used with the request;

assigning a snapshot timestamp value to the request according to the selected snapshot isolation protocol;

executing the request; and returning execution results to a database client.

15. The server of claim 14, wherein the semantic information is specified in a query language.

16. The server of claim 14, wherein the semantic information specifies a threshold time between a current time and a time the first worker node synchronized with the coordinator node.

17. The server of claim 16, the processing further comprising:
determining that the threshold is satisfied.

18. One or more tangible computer-readable media storing computer-executable instructions for causing a server programmed thereby to perform processing of requests for database operations within a database environment implementing a distributed database system using query language statements, the server implementing a first worker node of a database system, the first worker node being in communication with a coordinator node, and the database system further including at least a second worker node, the database transaction processing comprising:

receiving a first multi-node query language statement to read or write data to the distributed database system, the first multi-node query language statement comprising a result lag time value;

determining a difference between a current time and a time the first worker node synchronized a local snapshot identifier with a global snapshot identifier;

determining that the difference is less than, or less than or equal to, the result lag time value specified in the first multi-node query langue statement;

assigning the local snapshot identifier to the multi-node query language statement;

executing the first multi-node query language statement; and returning execution results of the first multi-node query language statement to a database client.

19. The one or more tangible computer-readable media of claim 18, the processing further comprising:
synchronizing the local snapshot identifier with the global snapshot identifier; and
recording a time associated with the synchronization.

20. The one or more tangible computer-readable media of claim 18, the processing further comprising:
- receiving a second multi-node query language statement, the second multi-node query language statement comprising a result lag time value;
- determining that the difference is greater than, or greater than or equal to, the result lag value of the second-multi node query language statement;
- requesting a current global snapshot identifier value from the coordinator node;
- receiving the current global snapshot identifier value from the coordinator node;
- assigning the current global snapshot identifier value as the local snapshot identifier value;
- recording a time associated with the assigning;
- assigning the assigned local snapshot identifier value to the second multi-node query language statement;
- executing the second multi-node query language statement; and
- returning execution results of the second multi-node query language statement to the database client.

\* \* \* \* \*